US012762508B2

(12) United States Patent
Alden et al.

(10) Patent No.: US 12,762,508 B2
(45) Date of Patent: Oct. 13, 2026

(54) ORDER FULFILLMENT SYSTEM AND METHOD WITH ITEM SENSOR

(71) Applicants: Richard Mathias Alden, Loveland, OH (US); Benjamin V. Savage, Loveland, OH (US)

(72) Inventors: Richard Mathias Alden, Loveland, OH (US); Benjamin V. Savage, Loveland, OH (US)

(73) Assignee: APEX INDUSTRIAL TECHNOLOGIES LLC, Mason, OH (US)

( * ) Notice: Subject to any disclaimer, the term of this patent is extended or adjusted under 35 U.S.C. 154(b) by 0 days.

(21) Appl. No.: 15/983,776

(22) Filed: May 18, 2018

(65) Prior Publication Data

US 2018/0268358 A1 Sep. 20, 2018

Related U.S. Application Data

(63) Continuation-in-part of application No. 14/991,231, filed on Jan. 8, 2016, now Pat. No. 10,216,157.

(60) Provisional application No. 62/101,717, filed on Jan. 9, 2015, provisional application No. 62/508,738, filed on May 19, 2017.

(51) Int. Cl.

| | |
|---|---|
| ***G06Q 10/08*** | (2012.01) |
| ***G06Q 10/087*** | (2023.01) |
| ***G06Q 50/12*** | (2012.01) |
| ***G07C 9/00*** | (2020.01) |

(52) U.S. Cl.
CPC .......... *G06Q 10/087* (2013.01); *G06Q 50/12* (2013.01); *G07C 9/00174* (2013.01)

(58) Field of Classification Search
CPC ... G06Q 10/087; G06Q 50/12; G07C 9/00174
USPC .......................................................... 700/231
See application file for complete search history.

(56) References Cited

U.S. PATENT DOCUMENTS

| | | | | |
|---|---|---|---|---|
| 2,564,552 A * | 8/1951 | Verdery, Jr. | G07F 11/60 | 221/75 |
| 3,634,884 A * | 1/1972 | Ross | G01V 3/12 | 342/28 |
| 3,810,561 A * | 5/1974 | Merkl | G07F 11/26 | 221/253 |
| 4,006,821 A | 2/1977 | Sautter | | |

(Continued)

FOREIGN PATENT DOCUMENTS

| | | | |
|---|---|---|---|
| CA | 2094477 A * | 10/1993 | G01G 19/56 |
| CN | 103735059 A * | 4/2014 | B65H 3/24 |

(Continued)

OTHER PUBLICATIONS

U.S. Patent and Trademark Office, as International Searching Authority, International Search Report and Written Opinion, International Application No. PCT/US2018/033361, 9 pages, dated Aug. 27, 2018.

(Continued)

*Primary Examiner* — Rakesh Kumar
(74) *Attorney, Agent, or Firm* — Thompson Hine LLP

(57) ABSTRACT

An order fulfillment system including a frame defining a passageway, a tray positioned in the passageway and pivotable between a first position and a second position, and a sensor system configured to sense the position of the tray.

39 Claims, 16 Drawing Sheets

(56) References Cited

U.S. PATENT DOCUMENTS 4,009,476 A * 2/1977 Lutz .......................... E05F 15/73 49/31
4,791,411 A * 12/1988 Staar .......................... G07F 9/026 340/568.1
4,953,643 A * 9/1990 Ellion .......................... G01G 13/04 222/196
4,970,374 A * 11/1990 Ueda .......................... H05B 6/6464 177/210 C
4,982,948 A 1/1991 Burger et al.
5,005,657 A * 4/1991 Ellion .......................... G01G 13/04 177/122
5,014,875 A * 5/1991 Mclaughlin .......... G07F 17/0092 312/215
5,020,719 A 6/1991 Roth et al.
5,263,596 A * 11/1993 Williams .......... G07F 17/0092 221/198
5,303,844 A * 4/1994 Muehlberger .......... G07F 11/42 221/75
5,385,265 A * 1/1995 Schlamp .......... G07F 17/0092 700/242
5,392,951 A * 2/1995 Gardner .......... G07F 17/0092 221/244
5,460,294 A * 10/1995 Williams .......... G07F 11/42 221/256
5,728,999 A * 3/1998 Teicher .......... G07F 11/30 235/380
5,833,151 A * 11/1998 Doak .......... B02C 19/0087 241/37.5
5,905,653 A * 5/1999 Higham .......... G07F 17/0092 700/242
6,102,162 A * 8/2000 Teicher .......... G07F 17/0042 186/39
6,173,582 B1 * 1/2001 Hixson .......... F25D 25/00 62/457.4
6,427,865 B1 * 8/2002 Stillwell .......... G07F 11/54 221/133
6,433,684 B1 * 8/2002 Lie .......... A47G 29/1214 340/556
6,464,142 B1 * 10/2002 Denenberg .......... G07F 17/0092 235/462.46
6,616,010 B2 * 9/2003 Yuyama .......... G06K 17/0022 221/282
6,682,156 B2 * 1/2004 Herrington .......... G07F 11/62 250/221
6,694,221 B2 * 2/2004 Chavez .......... G07F 5/26 700/244
6,701,218 B2 3/2004 Koike et al.
6,847,861 B2 * 1/2005 Lunak .......... G06Q 10/087 700/242
6,986,509 B2 * 1/2006 Koh .......... B65H 7/06 271/265.01
7,077,286 B2 * 7/2006 Shows .......... G07F 11/62 221/92
7,410,098 B2 * 8/2008 Denenberg .......... G07F 17/0042 235/385
7,537,155 B2 * 5/2009 Denenberg .......... G06K 17/00 235/382
7,627,281 B2 * 12/2009 Tanaka .......... B65H 7/04 271/259
7,747,477 B1 * 6/2010 Louie .......... G07G 1/009 705/28
8,061,555 B2 * 11/2011 Guglielmi .......... G07F 11/42 221/121
8,387,972 B1 * 3/2013 Ledgerwood .......... B65H 7/04 271/171
8,700,211 B2 * 4/2014 Shoenfeld .......... A47B 88/90 700/242
9,135,403 B1 9/2015 Tolmosoff
9,322,207 B2 4/2016 Savage et al.
9,454,869 B1 * 9/2016 Martuch .......... G07F 11/10
9,532,666 B2 1/2017 Savage et al.
9,557,209 B2 1/2017 Savage et al.
9,663,974 B2 5/2017 Savage et al.
9,694,488 B2 7/2017 Savage et al.
10,206,525 B2 * 2/2019 Huffar .......... F25D 17/042
10,216,157 B2 * 2/2019 Savage .......... G05B 15/02
11,667,508 B2 * 6/2023 Abeygunawardana .. B67D 1/16 222/108
11,776,349 B2 * 10/2023 Davitt .......... G07F 11/44 221/268
2001/0042024 A1 * 11/2001 Rogers .......... G06Q 30/0635 705/26.81
2004/0131505 A1 7/2004 Koeda
2005/0021175 A1 * 1/2005 Bain .......... G07F 11/62 700/236
2006/0102646 A1 * 5/2006 Godlewski .......... G07F 11/54 221/76
2006/0223169 A1 * 10/2006 Bedingham .......... G01N 21/645 356/323
2006/0226169 A1 * 10/2006 Davis .......... B65G 59/026 221/211
2006/0265102 A1 * 11/2006 Bain .......... G07F 11/62 700/237
2009/0112361 A1 * 4/2009 Berg .......... G07F 9/002 700/231
2009/0137047 A1 * 5/2009 Regan .......... G01N 35/04 422/67
2009/0248876 A1 * 10/2009 Tsuji .......... G03B 27/00 709/226
2010/0301716 A1 * 12/2010 Ranitlla .......... E05B 47/00 340/568.1
2012/0029690 A1 * 2/2012 Bruck .......... G07F 11/12 221/92
2012/0153783 A1 * 6/2012 Shoenfeld .......... A61L 2/10 362/133
2012/0200213 A1 * 8/2012 Savage .......... E06B 7/00 49/70
2012/0200385 A1 * 8/2012 Savage .......... G06Q 10/087 340/5.7
2015/0153218 A1 6/2015 Savage et al.
2015/0366377 A1 * 12/2015 Savage .......... H02G 1/00 312/270.3
2016/0053514 A1 2/2016 Savage et al.
2016/0193094 A1 * 7/2016 Bertrand .......... A61G 3/063 414/809
2016/0200517 A1 * 7/2016 Savage .......... G05B 15/02 700/216
2016/0208543 A1 7/2016 Savage et al.
2018/0268358 A1 * 9/2018 Alden .......... G07C 9/00174

FOREIGN PATENT DOCUMENTS

GB 2348635 A * 10/2000 .......... B65H 3/24
WO WO-2020146736 A1 * 7/2020 .......... G06Q 10/0832

OTHER PUBLICATIONS

U.S. Patent and Trademark Office, Advisory Action, U.S. Appl. No. 14/991,231, 4 pages, dated Aug. 15, 2018.
U.S. Non-Final Office Action, U.S. Appl. No. 14/991,231, 8 pages, dated Oct. 26, 2016.
U.S. Final Office Action, U.S. Appl. No. 14/991,231, 9 pages, dated Mar. 29, 2017.
U.S. Advisory Action, U.S. Appl. No. 14/991,231, 2 pages, dated Jun. 12, 2017.
U.S. Notice of Panel Decision, U.S. Appl. No. 14/991,231, 2 pages, dated Aug. 15, 2017.
U.S. Non-Final Office Action, U.S. Appl. No. 14/991,231, 9 pages, dated Jan. 4, 2018.
U.S. Final Office Action, U.S. Appl. No. 14/991,231, 10 pages, dated May 11, 2018.
European Patent Office, European Search Report and Search Opinion, European Patent Application No. 18802740.3, 7 pages (dated Oct. 8, 2020).
AU, Examination Report No. 1, Australian Patent Application No. 2018269927, 6 pages (dated Jun. 15, 2020).

(56) References Cited

OTHER PUBLICATIONS

AU, Australian Patent Office, Examination Report No. 2, Australian Patent Application No. 2018269927, 4 pages.
European Patent Office, Examination Report (Communication Pursuant to Article 94(3) EPC), European Patent Application No. 18802740.3, 7 pages, Apr. 12, 2022.
Canadian Patent Office, Examination Report issued Aug. 15, 2022 which pertains to Canadian Patent Application No. CA 3,063,438; 3 pages.
Canadian Intellectual Property Office, Examination Report, Canadian Patent Application No. 3,063,438, 3 pages, May 12, 2023.
European Patent Office, Article 94(3) EPC Examination Report issued Aug. 1, 2023 which pertains to EP Patent Application No. 18 802 740.3, filed May 19, 2018. 5 pages.
Canadian Intellectual Property Office, Office Action, Canadian Patent Application No. 3063438, 3 pages, 2024-06-27.

* cited by examiner

ORDER FULFILLMENT SYSTEM AND METHOD WITH ITEM SENSOR

This application claims priority to U.S. Provisional Patent Application Ser. No. 62/508,738, filed on May 19, 2017 and entitled ORDER FULFILLMENT SYSTEM AND METHOD WITH ITEM SENSOR. In addition this application is a continuation-in-part of U.S. patent application Ser. No. 14/991,231, filed on Jan. 8, 2016 and entitled ORDER FULFILLMENT SYSTEM AND METHOD, which in turn claims priority to U.S. Provisional Patent Application Ser. No. 62/101,717, filed on Jan. 9, 2015 and entitled ORDER FULFILLMENT SYSTEM AND METHOD. The entire contents of all three of these applications are incorporated by reference herein.

This application is directed to an order fulfillment system, and more particularly, to an order fulfillment system which can track the status of its contents.

BACKGROUND

Sellers of various goods, such as retail operations, grocery stores, restaurant/food service and other sales and/or delivery operations are increasing utilizing self-service pick-up options for goods. The orders for such goods can in some cases be placed remotely and by any of a variety of methods, such as call-ahead phone calls, internet/web site ordering and/or mobile device ordering. Some retailers/operations accommodate pre-payment such that the customer need only provide proof of purchase before taking possession of the purchased items. Such pre-payment can avoid the need for on-site interaction with, or monetary exchange with, store personnel.

Efficiently fulfilling these remotely-initiated orders for in-store pickup can create a logistical challenge. In some existing settings, remote-order customers must wait in line with other customers upon arrival at the store, despite the fact that their orders are already prepared and ready for pick-up, and in some cases are already paid for. In addition, when a remote-order customer reaches the point of sale workstation in many existing scenarios, the cashier may be required to step away from his/her workstation to retrieve the order and confirm payment status before locating and delivering the appropriate product to the customer. This increases wait time for all customers. In some cases, businesses may increase staffing to provide fulfillment of such remote orders with dedicated personnel, which can impose a burden on store resources.

SUMMARY

In one embodiment the present disclosure is directed to a system with a tray that can receive an item thereon, where the position of the tray can be detected to thereby determine if an item has been dispensed. More particularly, in one embodiment the present disclosure is directed to an order fulfillment system including a frame defining a passageway, a tray positioned in the passageway and pivotable between a first position and a second position, and a sensor system configured to sense the position of the tray.

DETAILED DESCRIPTION

Figure 1:
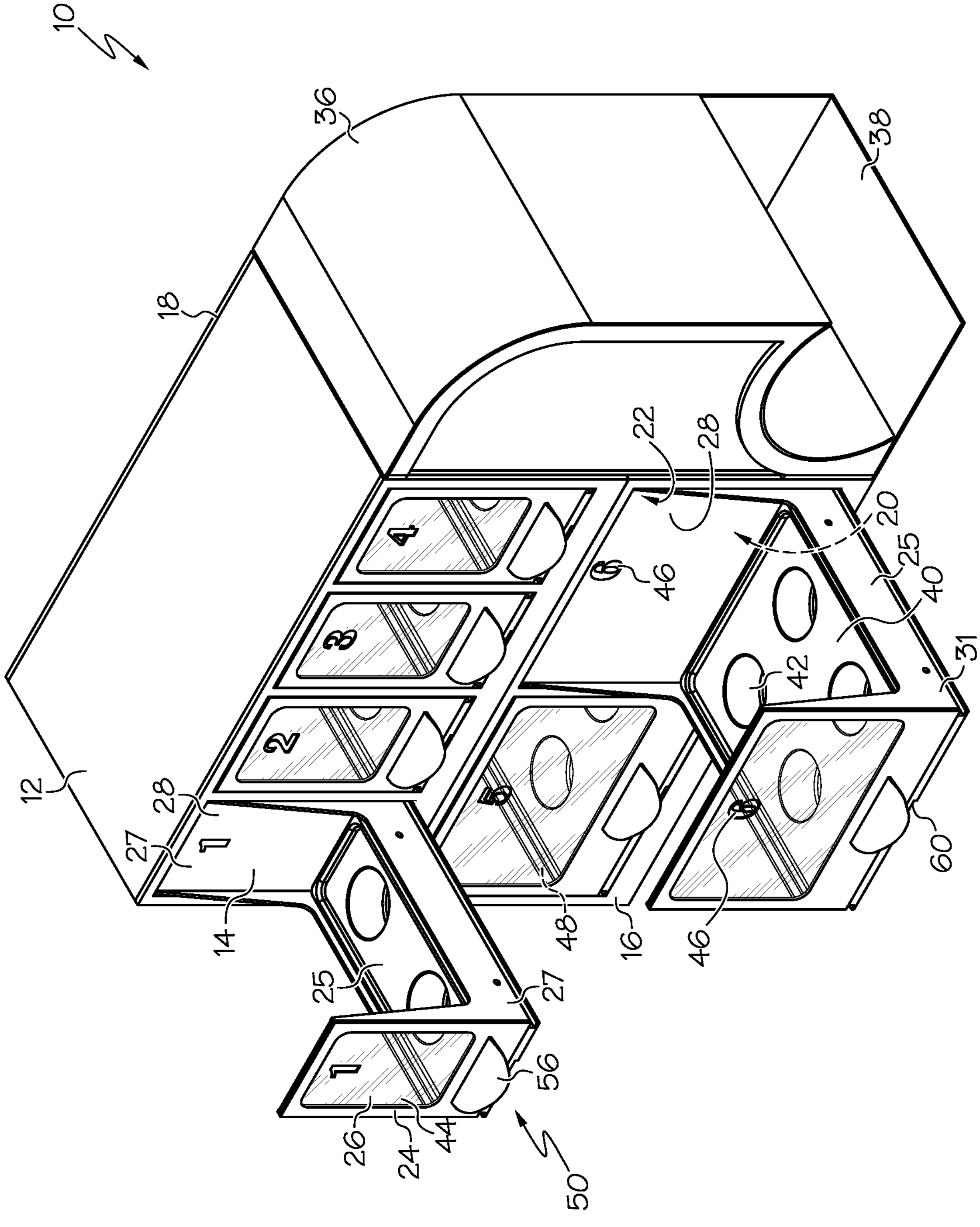
FIG. 1 is a front perspective view of one embodiment of an order fulfillment system.
Figure 2:
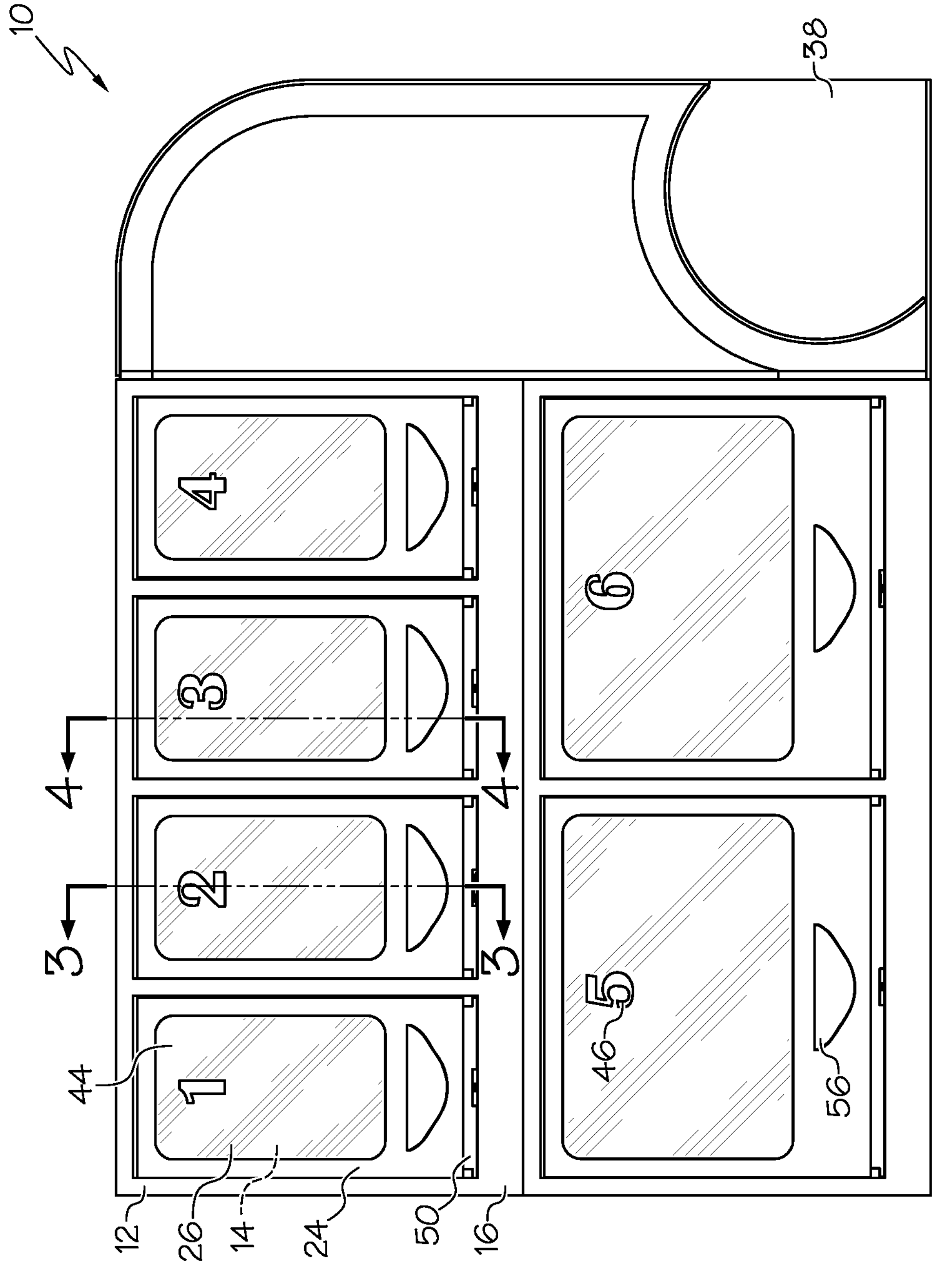
FIG. 2 is a front view of the system of FIG. 1.

The order fulfillment system 10 disclosed herein can be utilized to enable or facilitate the transfer of any of a variety of products, items or the like. The system can be utilized in conjunction with nearly any type of product, item or the like so long as such product, item or the like can be physically accommodated in the system 10, including but not limited to, food, beverages, groceries, pharmaceuticals, retail merchandise, parts, components, work pieces, hardware, and the like. The items or products forming part of or used in conjunction with the system 10 can in some cases take the form of or include a consumable item and/or associated packaging. However the product can also or instead take the form of various items or products packaged or bundled together, such as numerous items in a box, bag, carrier or the like. Moreover, the product could in one case take the form of a token that entitles the bearer to a product or service, such as an empty soda or soft drink cup that can be filled by the bearer/customer.

In one case a product, item or the like is transferred from or between two users or parties, termed a "stocking" party and a "retrieving" party herein. In many cases title/ownership of the product, item or the like is being, has been or will be transferred from the stocking party to the retrieving party, such as in a sale transaction. However, the system may also be used in some cases in a lending or leasing arrangement and/or to return a product to the stocking party in a return transaction. In other cases title may not necessary transfer, for example when items are dispensed by a company or facility for use by its employees or other personnel.

With reference to FIGS. 1, 2, 12, 14 and 15, the order fulfillment system 10 can include a frame 12 that defines one or more compartments or passageways 14 therethrough. Each compartment or passageway 14 can extend an entire thickness of the frame 12 between a retrieval side 16 and a stocking side 18 thereof. Each compartment 14 can be sized to store/receive an item or product 33 to be delivered to the retrieving party. Each passageway 14 has or terminates at an end or opening 20 on the retrieval side 16 of the frame 12 and an end or opening 22 on the stocking side 18 thereof. A tray or platform 24, 24' can be fixedly, movably or pivotally/tiltably positioned within each passageway 14. Each passageway 14 and tray 24, 24' can in one case be entirely positioned in and surrounded by the frame 12, with no access thereto, except through the end openings 20, 22.

In one embodiment, the frame 12 is a unitary housing component with a plurality of passageways 14 for a plurality of trays 24, 24'. Alternately, each tray 24, 24' may have its own individually-associated frame 12 that can be coupled to other frames 12 in a modular manner as shown for example in FIG. 20. The various passageways 14 of the different frames 12 may have the same or different shapes or dimensions, as appropriate for the products 33 to be transferred. In one embodiment, the passageways 14 are generally rectangular in cross section and are between about three and about twenty-four inches wide, and/or between about six and about twenty four inches high, and/or between about six and about twenty four inches deep. The passageways 14 may alternately have any of a variety of other shapes or dimensions as appropriate for the products 33 to be stored or transferred. Each tray 24, 24' can have about the same size and shape as a footprint of the passageway 14; for example, in one case each tray 24, 24' can have a surface area or footprint in top view that is at least about 75% in one case, or at least about 90% in another case, of a surface area or footprint in top view of the associated passageway 14, or its bottom surface thereof.

The system 10/frame 12 may include or be coupled to any of a variety of systems or devices for adjusting conditions inside the system 10/frame 12/passageways 14, such as heating devices, cooling or refrigeration devices, vents, humidifiers, dehumidifiers, systems for pressurizing and/or depressurizing, circulation and recirculating devices, etc. to control conditions within the system 10/frame 12/passageways 14 when products 33 reside in the system 10/frame 12/passageways 14. In addition, the system 10, frame 12, compartments 14, trays 24, 24' or other components may be made of materials that comply with relevant standards issued by NSF International in relation to materials for use near or in contact with food, such as food storage, handling and/or dispensing equipment. In one case the components can be made of or include a translucent, food-safe polymer material. In cases where the system 10 is to be used for dispensing liquids, the system 10, frame 12, compartments 14, trays 24, 24' or other components may be generally fluid-tight and lack crevices, seams, etc., and thus be designed to accommodate fluid spills while ensuring continuing operation of the system 10. In one case for example, the system 10 may include fluid channels that route spilled fluid to a fluid-tight reservoir that can be periodically emptied or cleaned.

Figure 3:
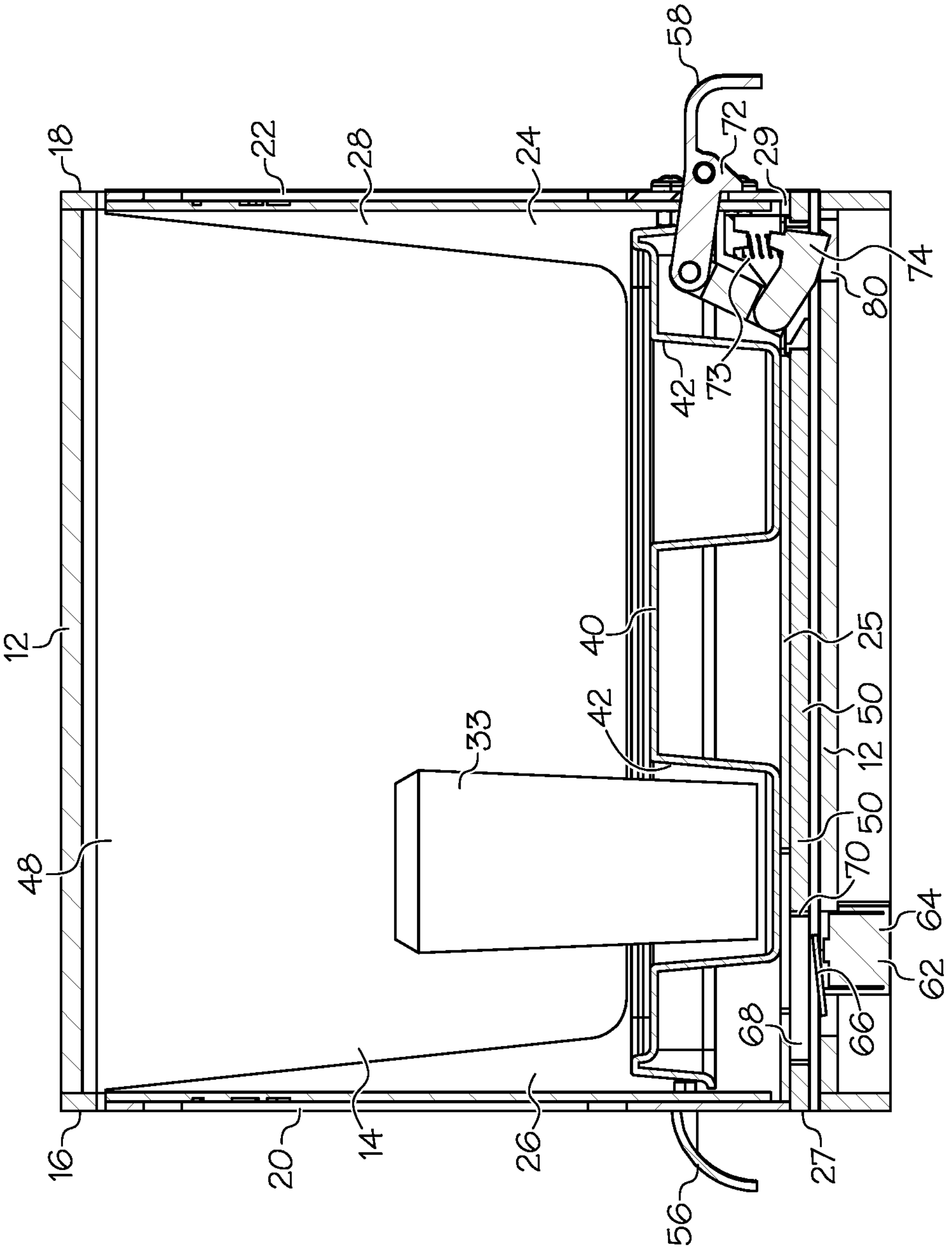
FIG. 3 is a cross section of a portion of the system of FIGS. 1 and 2, taken along line 3-3 of FIG. 2.

FIGS. 1-13 illustrate a first embodiment of the system 10. With reference to FIGS. 5 and 6, each tray 24 of this embodiment can include a product support surface or portion 25 that extends in the direction of the passageway 14 and is oriented generally horizontally during use. The product support portion 25 is configured to receive, and support thereon, the product 33 to be transferred from the stocking party to the retrieving party. For example, as shown in FIGS. 3 and 5, the product support portion 25 can include a generally cylindrical recess 42 configured to receive a product 33 to be dispensed therein, wherein the product 33 takes the form of a generally cylindrical cup of coffee in the illustrated embodiment.

Each tray 24 can be movable/translatable through the associated passageway 14 within and at least partially beyond the confines/outer edges/outer perimeter of the frame 12. For example, each tray 24 can be movable to a first extended position wherein the tray 24 at least partially passes or extends through the opening 20 on the retrieval side 16. As shown in FIG. 1 the trays 24 labelled with indicia 46 "1" and "6" are each in an extended position on the retrieval side 16 of the frame 12. When in the first extended configuration the trays 24 provide a retrieving party access to the product support portion 25 of the tray 24 and/or products 33 stored thereon, from the retrieval side 16 of the frame 12. Each tray 24 may also be moved/translated to a second extended position wherein the tray 24 at least partially passes or extends through the opening 22 on the stocking side 18 of the frame 12. In this position the tray 24 extends beyond the frame 12 on the stocking side 18 of the frame 12. When in the second extended position on the stocking side 18, the tray 24 provides access to the support portion 25 such that a stocking party can place a product 33 thereon for retrieval by the retrieving party. It should be noted in actual order of use for a given transaction the tray 24 may be first moved to the "second" extended position outlined above (on the stocking side 18) and then moved to the "first" extended position (on the retrieval side 16), and thus the designation of "first" and "second" extended positions can be reversed if desired.

The tray 24 can also be positionable in a closed or retracted position wherein, in one case, the tray 24 is centered or generally centered in the frame 12 and/or the associated passageway 14 in a front to back direction. In one embodiment, the tray 24 is entirely, or generally entirely, contained within the frame 12 when in the closed position (see FIGS. 3, 4, 11 and 12), although in some cases portions of the tray 24 may protrude on the stocking side 18 and/or retrieval side 16. For example, the trays 24 labelled with indicia 46 "2" through "5" in FIG. 1 are in their closed position. Each tray 24 may include a handle 56 on the retrieval side 16 and handle 58 on the stocking side 18 to facilitate manual movement of the tray 24 within the passageway 14 to or from either side 16, 18.

The tray 24 can include a pair of panels 26, 28 at each end thereof which provide access control systems or features to limit access to contents of the tray 24/passageway 14. Each panel 26, 28 is oriented generally perpendicular to the support portion 25, and oriented generally vertically in one case. Panel 26 extends from the product support portion 25 at or near an end 27 thereof. Panel 28, which is optional in some cases, extends from the product support portion 25 at or near an end 29 thereof. Panel 26 may be sized and positioned to generally block the passageway 14 and thereby restrict access to the product support portion 25 of the tray 24 (and a product 33 positioned thereon) when the panel 26 is generally aligned with the opening 20, for example when the tray 24 is in its a closed position. Panel 26 can also restrict passage through the passageway 14 when the tray 24 is in its second extended position (i.e. protruding toward the stocking side 18). Conversely, when the tray 24 is in its first extended position (i.e. protruding toward the retrieval side 16, as in the case of trays "1" and "6" in FIG. 1) panel 26 is moved away from (but still aligned with) opening 20, and does not block access to the passageway 14.

Panel 28, if utilized, can also be sized and configured to be positioned in the opening 22 and generally block the passageway 14 when the tray 24 is its closed position. Panel 28 can also restrict access through the passageway 14 when the tray 24 is in its first extended position (i.e. protruding toward the retrieval side 16, as in the case of trays labelled with indicia 46 "1" and "6" in FIG. 1). Conversely, when the tray 24 is in its second extended position (i.e. protruding toward the stocking side 18) panel 28 is moved away from opening 22, and does not block access to the passageway 14.

Figure 7:
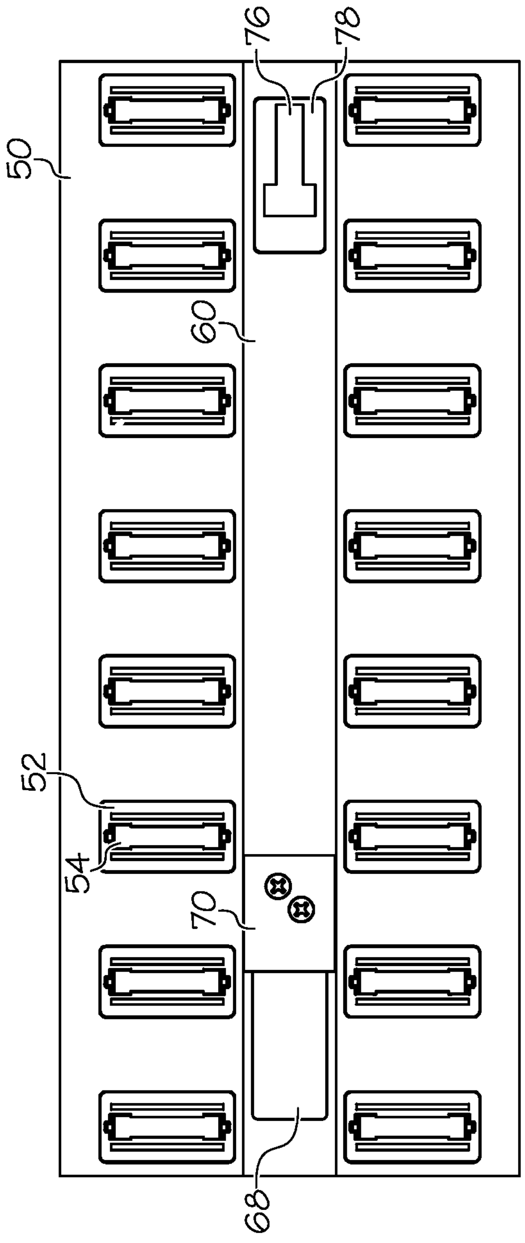
FIG. 7 is a bottom view of a roller assembly of the system of FIG. 1.

With reference to FIG. 7, each tray 24 may include a roller assembly 50 attached to a bottom surface thereof to facilitate translation of the tray 24 through the passageway 14 of the frame 12. In one embodiment, the roller assembly 50 is attached to or integral with a bottom surface of the tray 24 (see FIG. 4). Alternately, the roller assembly 50 may be attached to or integral with the frame 12 within the passageway 14. The roller assembly 50 includes a plurality of roller modules 52, where each roller module 52 contains a roller 54 oriented to permit the tray 24 to move in either direction through the passageway 14 to reach either extended position. It should be understood that the system can include any of a variety of other roller systems, bearings, low friction surfaces, sliders, rails, grooves, etc. to guide movement of the trays 24. Moreover, in some cases each tray 24 may simply be slidably positioned on a flat underlying surface.

As discussed in more detail below, the tray 24/roller assembly 50 may also include a channel 60 (FIG. 7) that runs parallel to the passageway 14 to house and/or accommodate any of a variety of mechanisms that can control or otherwise restrict free movement of the tray 24 within the passageway 14. In one embodiment, the channel 60 is generally centrally located within the roller assembly 50.

Figure 4:
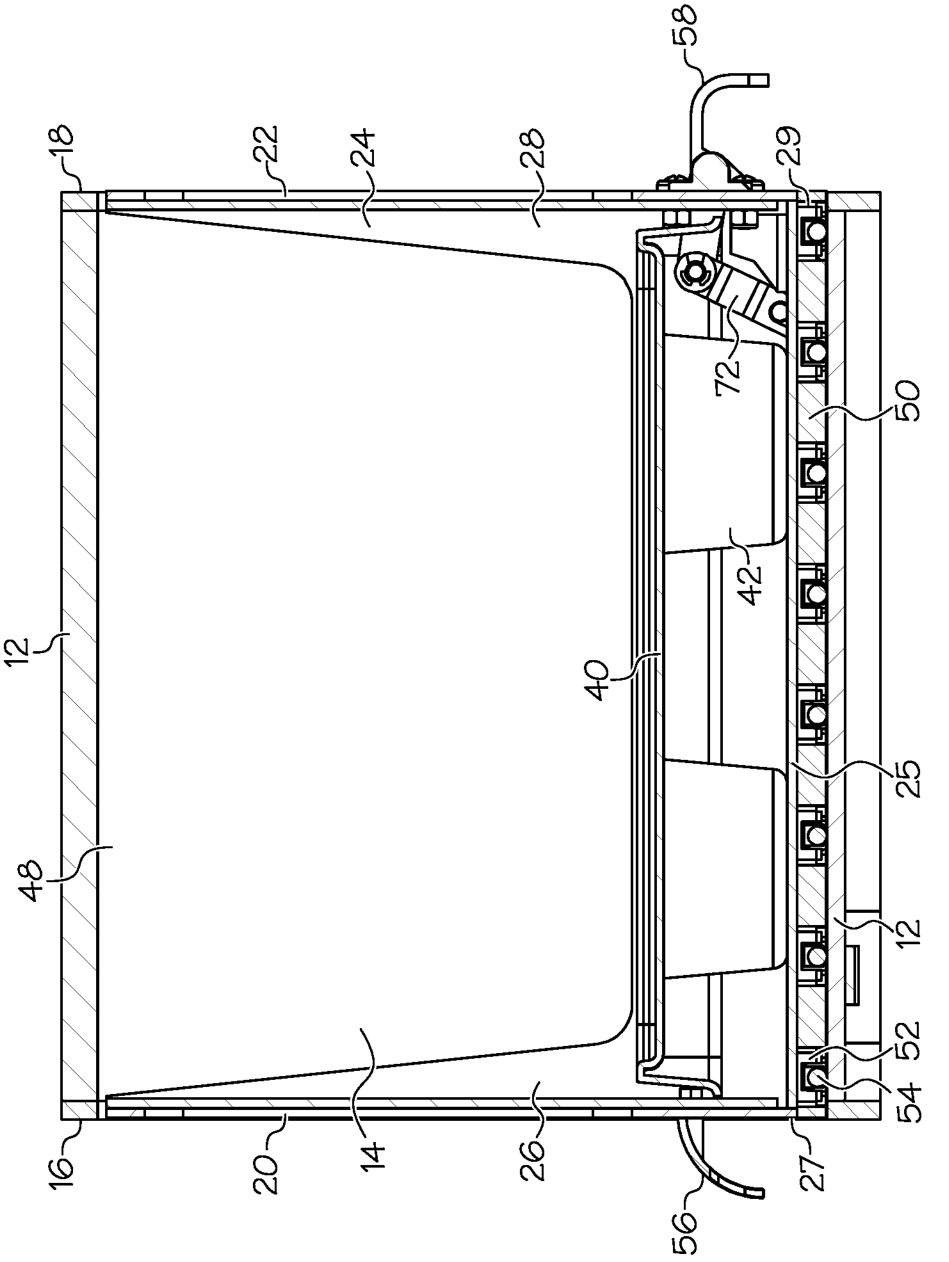
FIG. 4 is a cross section of a portion of the system of FIGS. 1 and 2, taken along line 4-4 of FIG. 2.
Figure 5:
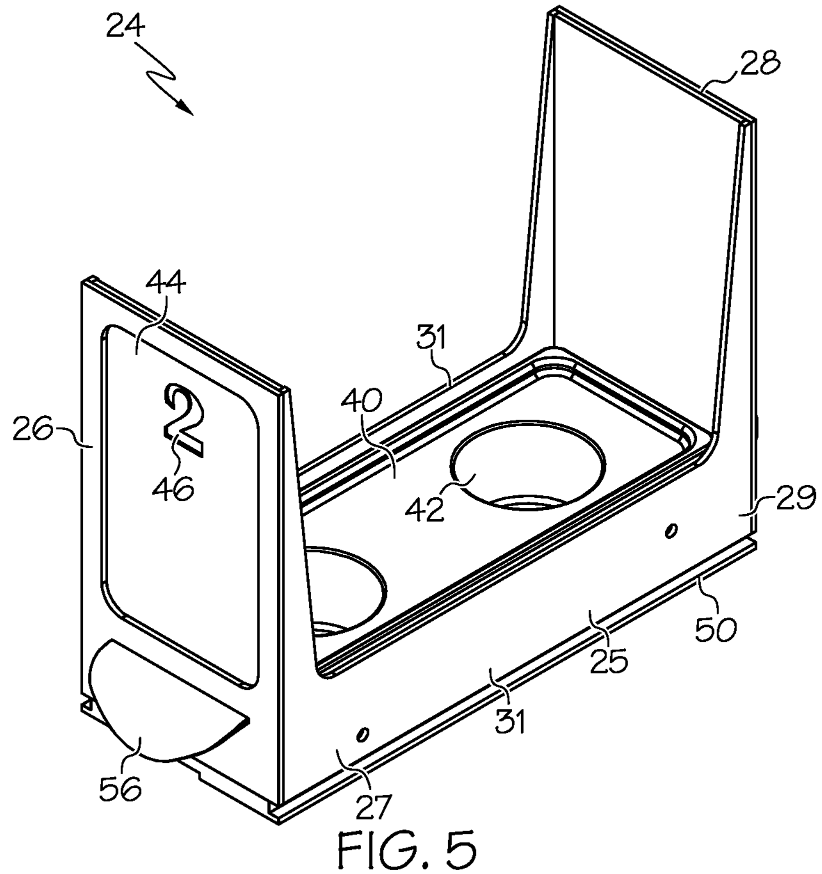
FIG. 5 is a front perspective view of a tray of the system of FIG. 1.
Figure 6:
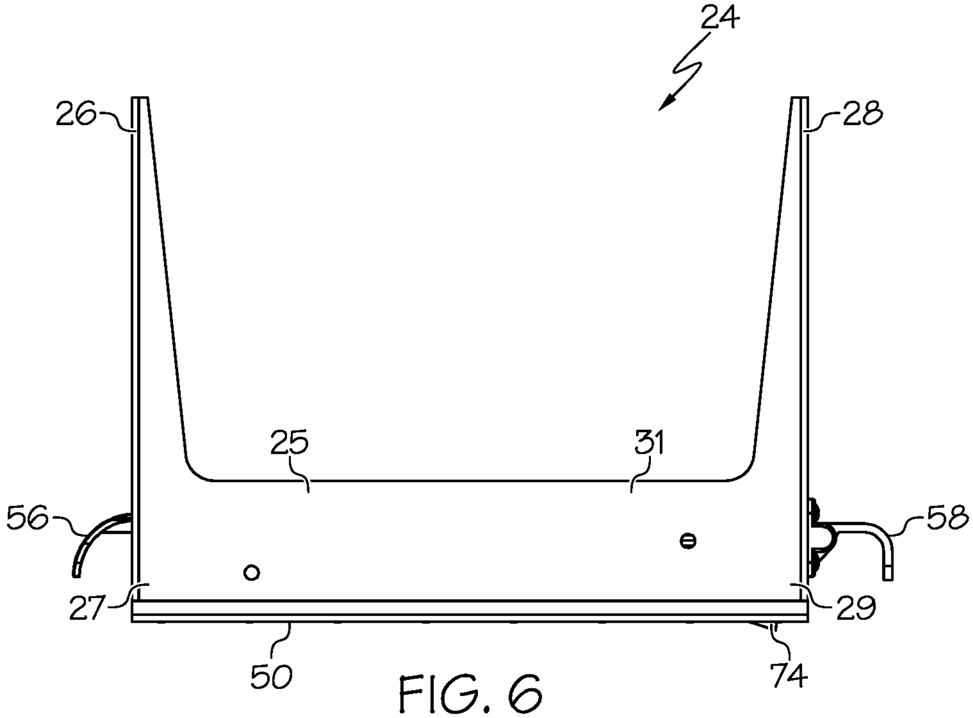
FIG. 6 is a side view of the tray of FIG. 5.

Referring now to FIGS. 3-6, one embodiment of a tray 24 is shown in greater detail. In the embodiment of FIGS. 3 and 4, the tray 24/support portion 25 has a length approximately equal to or slightly shorter than a length of the passageway 14 in which it is positioned. However, in some cases the tray 24/support portion 25 can have a length greater than a length of the passageway 14 such that the tray 24/support portion 25 extends beyond and edge of one or both of the openings 20, 22 when the tray 24 is in its closed position to provide ease of gripping. In one embodiment, the panels 26, 28 extend generally perpendicular to the direction of movement/translation of the tray 24 within the passageway 14. The panels 26, 28 may be shaped and sized to generally match the cross-sectional size and/or shape of the passageway 24 and/or the associated openings 20, 22. Accordingly, when the tray 24 is in the closed position, in one case the panels 26, 28 generally align with their associated opening 20, 22, and both openings 20, 22 (and/or the passageway 14) are generally filled or blocked (e.g. in one case, at least about 80%, or in another case at least about 90%, of the surface area of each opening 20, 22 or passageway 14 is blocked, and/or no gaps or openings are provided about the panels 26, 28 that have a height (or greatest dimension) greater than about ½" inch in one case to prevent a person's hand from reaching therethrough). When the tray 24 is in its closed position the frame 12 and the panels 26, 28 thus form a closed or generally closed compartment 48 for storing a product 33.

When the tray 24 is in its closed position the support portion 25 of the tray 24 may not be able to be accessed (e.g. manually accessed in one case), and more particularly may not be able to be accessed from the retrieval side 16 and/or stocking side 18. Instead, if access to the support portion 25 and/or products 33 stored thereon is desired the tray 24 must be moved in either direction to an extended position where one of the panels 26, 28 is positioned sufficiently outside/beyond the associated opening 20, 22 to provide access from one of the sides 16, 18. For example, FIG. 1 illustrates a configuration in which the trays 24 labeled with indicia 46 "1" and "6" are in an extended position on the retrieval side 16, and access is provided to the contents of trays 24 from the retrieval side 16.

One or both panels 26, 28 may be made of generally opaque material. One or both panels 26, 28 may be formed of or include a window 44 of a transparent or translucent material such as glass, plastic, or acrylic to permit viewing of the contents of the tray 24 when the trays 24 are in their closed positions. Moreover, in embodiments including a plurality of trays 24, the trays 24, and more particularly the panels 26, 28, may include identifying indicia 46 such as alphanumeric characters or other symbols, color coding, or other characteristics to differentiate various trays 24 so that users on either side 16, 18 can readily identify a target tray 24. Each tray 24 may include the same, or in some cases different, indicia on both of its associated panels 26, 28. Alternately, the indicia 46 or other identifying features for the trays 24 may be positioned on portions of the frame 12 proximate to the passageways 14 in which the trays 24 are positioned or other appropriate locations and/or directly on doors 35, if utilized (as described in greater detail). The system 10 can also include light-emitting elements positioned on or adjacent to each tray 24/compartment 14/door 35 which can be activated to attract the retrieving party's (or stocking party's) attention. The light-emitting element may be able to emit various colors and be operated to attract the user's attention by flashing/blinking, etc. Other attention-attracting elements such as sound-emitting systems can be utilized.

If desired, one or more, or each tray 24, can lack a panel 28 proximate to the stocking side 18 of the frame. In this case the stocking party may be provided with unimpeded access to the support portion 25 of the tray 24 at all times. Controlling access to the support portion 25 of the trays 24 may be less important on the stocking side 18, such as when relatively low value products 33 are dispensed and/or when the stocking side 18 is relatively secure. However, in some cases, such as when relatively high value products 33 are dispensed and/or when the stocking side 18 is not relatively secure, it may be desired to utilize the panels 28 to control/limit unauthorized access by the stocking party.

Each tray 24 may also include a pair of opposed, spaced apart vertically oriented side panels 31 (FIGS. 1, 5 and 6). Each side panel 31 can extend along the sides of the tray 24 between the panels 26, 28 to thereby create a containment area about the support portion 25. The tray 24/product support portion 25 may thus be adapted to receive a removable insert 40 positioned on/in the support portion 25. For example, the insert 40 can define the recess 42 in the illustrated embodiment. The inserts 40 may be adapted to receive particular types of products 33, and differently-shaped inserts 40 can be used to accommodate different types of products 33 to improve presentation or safety. The inserts 40 can also be removable for easy cleaning, sterilization or replacement without having to remove the support portion 25 from the frame 12. Alternately, the support portion 25 itself may be shaped to provide such functionality without a separate insert 40.

In some cases, the system 10 may be configured or arranged such that the retrieving party only has access to the retrieval side 16 of the frame 12, and does not have access to the stocking side 18. For example, the frame 12 may be positioned in a wall, partition or the like (not shown), or itself form a wall, partition or the like, or be closely received in a correspondingly-sized opening in the wall, partition or the like to prevent a retrieving party from accessing the stocking side 18 of the frame 12. In other cases the frame 12 may be positioned on a counter (such as a service counter in a fast food or quick service counter, or otherwise adjacent to a restricted access area) in which the retrieving party's access to the stocking side 18 is blocked simply by the width/positioning of the counter and/or frame 16, and/or by the understanding that stocking side 18 is not supposed to be accessed by a customer. In this manner a stocking party can position products 33 to be dispensed in the system 10 from the stocking side 18. The products 33 can then reside in the frame 16 until the products 33 are accessed by a customer/retrieving party only on the retrieval side 16.

Figure 14:
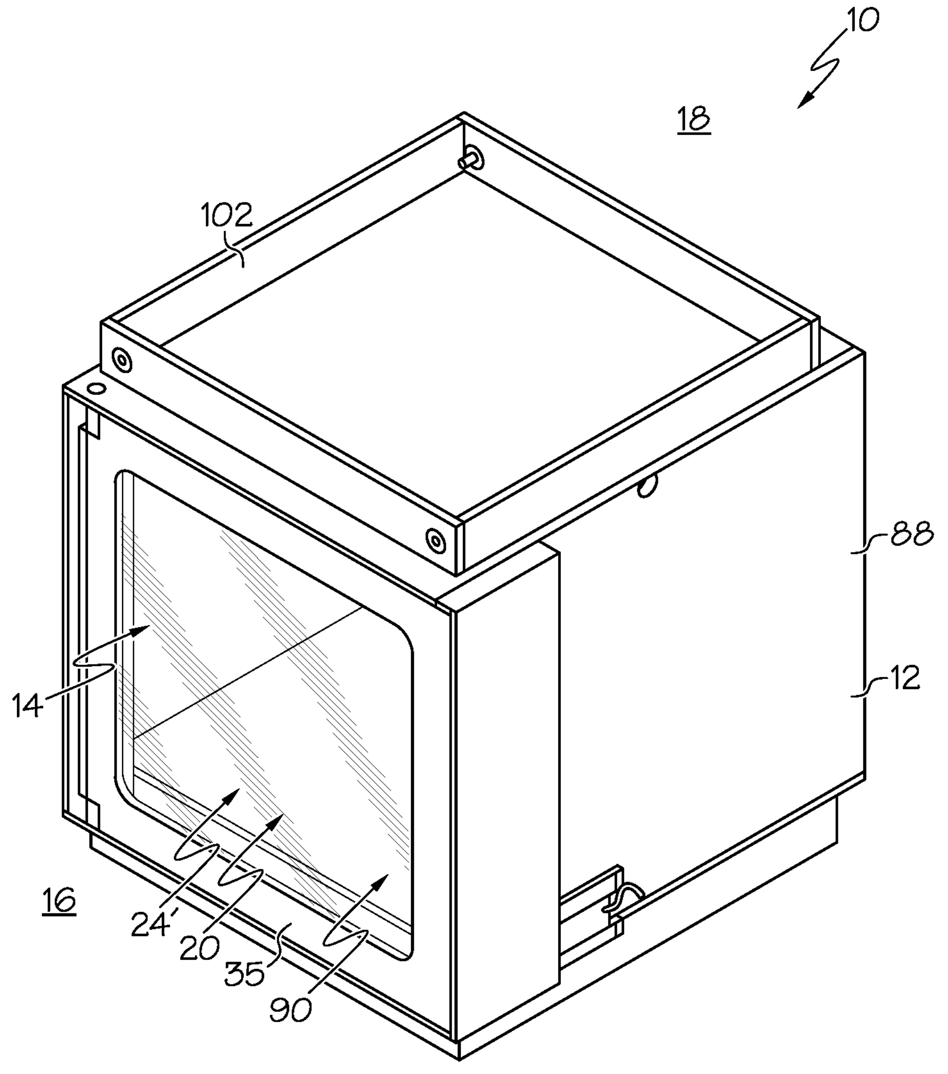
FIG. 14 is a front perspective view of a module of another embodiment of an order fulfillment system.
Figure 15:
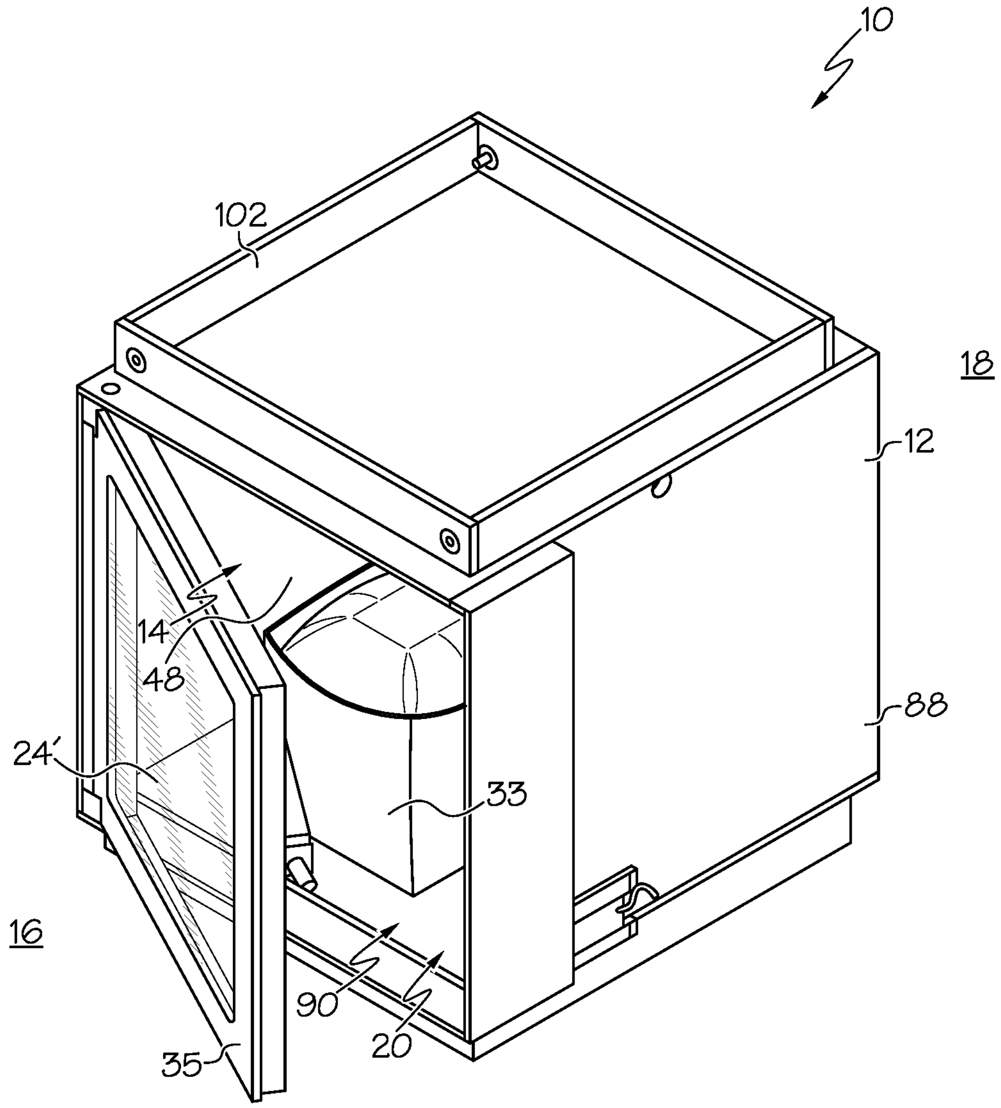
FIG. 15 is a front perspective view of the module of FIG. 14, with the door slightly open.

In one case, instead of, or in addition to the slidably tray 24 with end panels 26, 28, each compartment 14 may include a individually actuable movable/retractable doors 35 positioned in, at or adjacent to each opening 20, 22 at opposite ends of each compartment 14 (e.g. see door 35 in FIGS. 14 and 15). The doors 35 illustrated in FIGS. 14 and 15 have an opaque outer door frame with a transparent panel received therein. Each door 35 can be pivotable about a vertical hinge/axis positioned along one side of the compartment 14, or alternatively the door 35 can be pivotable about different axes, be foldable, collapsible or slidable, be vertically movable along a set of rollers similar to a garage door, or have other movable arrangements to selectively cover the associated opening 20, 22. Each door 35 can be movable between a first or closed position, where the door 35 generally blocks manual access to the compartment 14 from the side on which the door 35 is located, and a second or open position where the door 35 allows or does not generally block manual access to the compartment 14 from the side on which the door 35 is located. Each door 35 can thus provide access control systems or features to limit access to contents of the tray 24/passageway 14.

Each door 35 can be locked or lockable in its closed position by a latch 37 (FIGS. 16 and 18) that is actuable via a solenoid or the like. The door 35 shown in FIGS. 14 and 15 is positioned on the retrieval side 16 of the frame 12 to selectively provide/block access to the compartment 14 from the retrieval side 16. If desired another door 35 (not shown) can instead or in addition be positioned on the stocking side 18 of the frame 12 selectively provide/block access to the compartment 14 from the stocking side 18. In some cases, no doors are utilized, and instead relatively open access is provided both from the retrieval side 16 and the stocking side 18 (besides access blocked by the panels 26, 28 in the embodiment of FIGS. 1-13). When a door 35 is utilized, particularly but not limited to on the stocking side 18, a door 35 can cover a single or multiple compartments 14.

Figure 13:
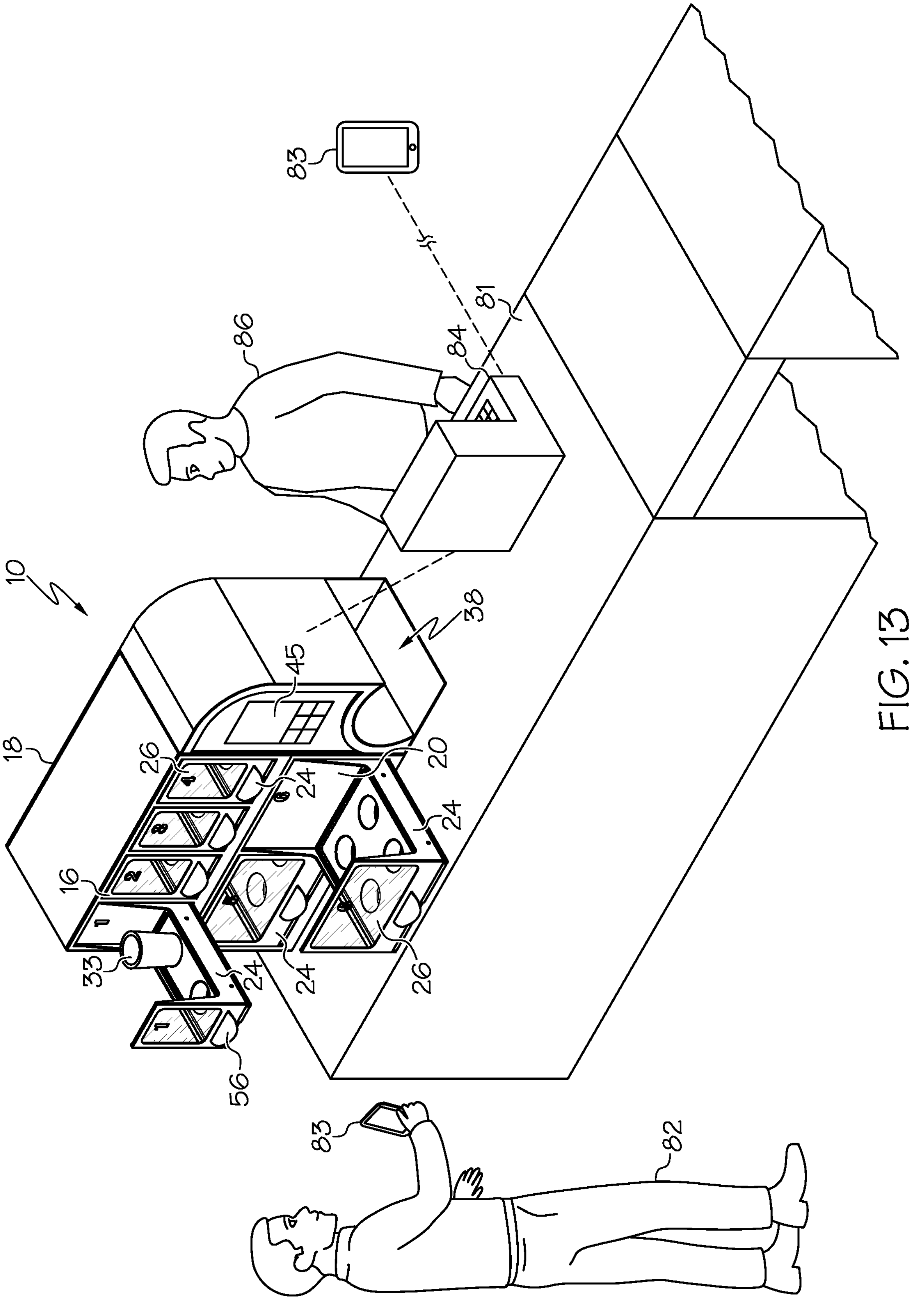
FIG. 13 is a schematic representation of a retail setting in which the system of FIG. 1 may be utilized.

The order fulfillment system 10 can be configured to selectively control access to the trays 24 from users or retrieval parties on the retrieval side 16 of the frame 12, the stocking side 18 of the frame 12, or both, by allowing and/or restricting movement of the tray 24 through the associated passageway 14 and/or by allowing and/or restricting movement of the door(s) 35. In one case, the order fulfillment system 10 may have and/or be operatively coupled to a controller 30 (FIG. 10) which can be operatively controlled to the doors 35 and/or latch 37 and associated solenoid and other components (such as solenoid 62) as will be described in greater detail below. The retrieving party may be able to interact with the controller 30 to gain access to the appropriate compartment 14, and in one case the appropriate product support portions 25 of the appropriate/authorized tray(s) 24 to thereby access the products 33. The controller 30 may include or take the form of a processor, CPU, computer or the like, and may include or be operatively coupled to a sensor such as a scanner 32 (FIG. 10) and/or a user interface 45 (FIG. 13) in the form of a keypad, touch screen, keyboard, mouse, track ball, audio input device, or the like. The user interface 45 is shown in FIG. 13 as being positioned on the retrieval side 16, but the user interface 45 could instead or in addition be positioned on or accessible from the stocking side 18, or have various other positions. The controller 30 may be operatively connected to a router 34 (FIG. 10) to facilitate further communication and internet access.

The system 10/frame 12 may include, be attached to, and/or be positioned proximate to the controller 30, scanner 32, router 34, and/or other electrical and/or electronic components. The system 10/frame 12 may include an aperture 38 configured to receive components to be scanned therein, such as a mobile device including a cellular phone, tablet or the like (displaying a scannable or readable code), a printed or electronic receipt, a hand or finger for biometric identification, or the like. In this manner the component to be scanned can be inserted into aperture 38 by the retrieving party (or, in some cases, by the stocking party) for scanning/authentication by the scanner 32 or other sensor. However, the system 10/frame 12 need not include the aperture 38, and the scanner 32 may simply be able to read/scan an item placed in sufficient proximity to the scanner 32, or scan in forward or other directions. The scanner 32 or other sensor can provide its output to the controller 30, which can provide access/permission to the retrieving party (or deny access/permission, if appropriate) to retrieve product(s) 33 from appropriate compartment(s) 14/tray(s) 24 of the order fulfillment system 10.

Instead of or in addition to the scanner 32/sensor, identification/authentication of a user can be implemented or carried out in a variety of manners, including by the use of a user identification and/or password (such as via the user interface 45), the use of a key fob or other wireless device which wirelessly transmits in the radio frequency (or other) range, a mechanical or electronic key, the use of a mobile phone or device, a card with a magnetic strip in conjunction with a magnetic strip/card reader, an authorization code or the like remotely transmitted to the controller 30 (e.g. via the internet), through receipt of payment via cash or credit card, or various other means or mechanisms. A retrieving party may also be identified and/or make payment by mobile payment services that wirelessly communicate with point of sale systems using a near filed communication (NFC) antenna or the like, such as via APPLE PAY® services or software offered by Apple Inc. of Cupertino Calif., or by other mobile wallet payment systems or digital wallet systems, and/or by implanted chips or the like.

In any case, in one embodiment upon grant of access to a particular compartment 14/tray 24 via the controller 30, that compartment 14/tray 24 and/or the indicia 46 thereon, or the associated door 35, may automatically illuminate, flash, partially or fully open, or provide some other type of sensory output/effect to expedite identification of the appropriate compartment(s) 14/tray(s) 24. It should be further understood that in some cases the stocking party may be required to be authenticated before being granted access to a compartment 14/tray 24 using any of the methods described herein.

Referring now to FIGS. 3-9, the order fulfillment system 10 of that embodiment may include one or more electronic and/or mechanical access control/restriction systems or mechanisms to restrict and/or allow access to the contents of the compartment 14/tray 24 by the stocking and retrieving parties. Generally, the stocking party may have broad or greater access to many or all of the compartments 14/trays 24 from the stocking side 18 of the frame 12. In contrast the retrieving party's access from the retrieval side 16 of the frame 12 may be more limited and/or strictly limited to the particular compartment(s) 14/tray(s) 24 which contains a product 33 that the retrieving party is authorized to accesses or possess (for example, after verification by the controller 30 of payment for the product 33). However, access may alternately be more strictly or loosely controlled on either side 16, 18 of the frame 12 as appropriate for the particular application.

Figure 8:
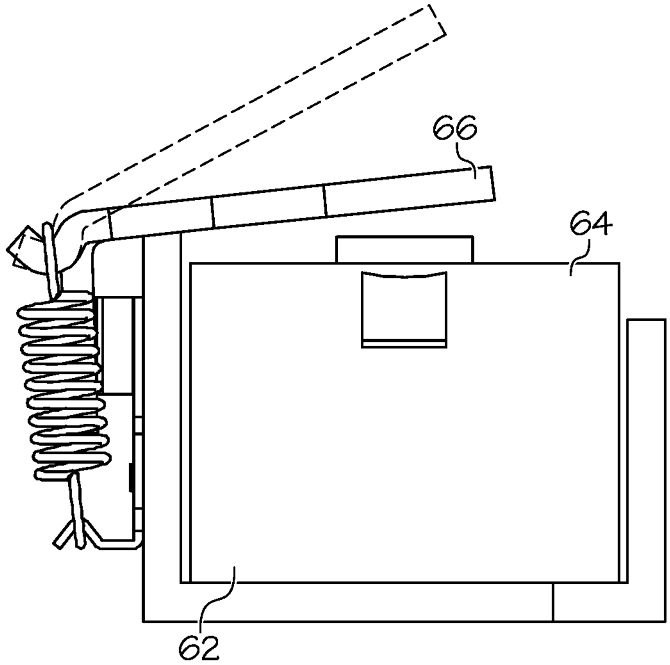
FIG. 8 is a side view of a solenoid which can be utilized in the system of FIG. 1.

With reference to FIGS. 3 and 8, the order fulfillment system 10 may include, for each passageway 14/tray 24, a solenoid, transducer, or other activatable component 62 associated therewith and operatively coupled to the controller 30 to control access to the contents of the tray 24. The solenoid 62 includes a body 64 which may be positioned within the frame 12 beneath the roller assembly 50 of the tray 24, and a plate 66 which is movable between a retracted position where the plate 66 is positioned adjacent the body 64 (shown in solid lines in FIG. 8) and an extended position (shown in dashed lines in FIG. 8) where the plate 66 extends upwards through an aperture 68 (FIG. 7) in the channel 60 of the roller assembly 50. Accordingly, when the plate 66 is in the extended position and a retrieving party on the retrieval side 16 attempts to move the tray 24 to the first extended position and gain access to an associated product 33 (with reference to FIG. 3, pulling handle 56 to the left), a stop 70 at the edge of the tray 24/roller assembly 50 contacts the plate 66, which prevents such attempted extraction of the tray 24. The plate 66 and stop 70 may be configured to block movement of the tray 24 to the first extended position when the plate 66 is raised, but allow movement of the tray 24 toward the second extended position when the plate 66 is raised. Alternately, the plate 66 and stop 70 may be configured to block movement of the tray 24, when the plate 66 is actuated, in both directions away from its closed position (e.g. block movement of the tray 24 toward either the first or second extended position).

In contrast, if the plate 66 is in the retracted position, then the plate 66 is not positioned in the aperture 68 and the tray 24 can be moved past the opening 20 on the retrieval side 16 (and/or past the opening 22 on the stocking side 18) to enable the retrieving party (or stocking party) to access the contents of the tray 24. Thus, the retrieving party (or stocking party) may in some cases only access the contents of the tray 24 upon satisfaction of all conditions set by the controller 30 to retain the solenoid 62/plate 66 in the retracted position. The controller 30 could also be human-controlled, where a person provides direct instructions to the controller 30 to unlock the tray 24 after, for example, identifying the purchaser and processing payment.

Figure 9:
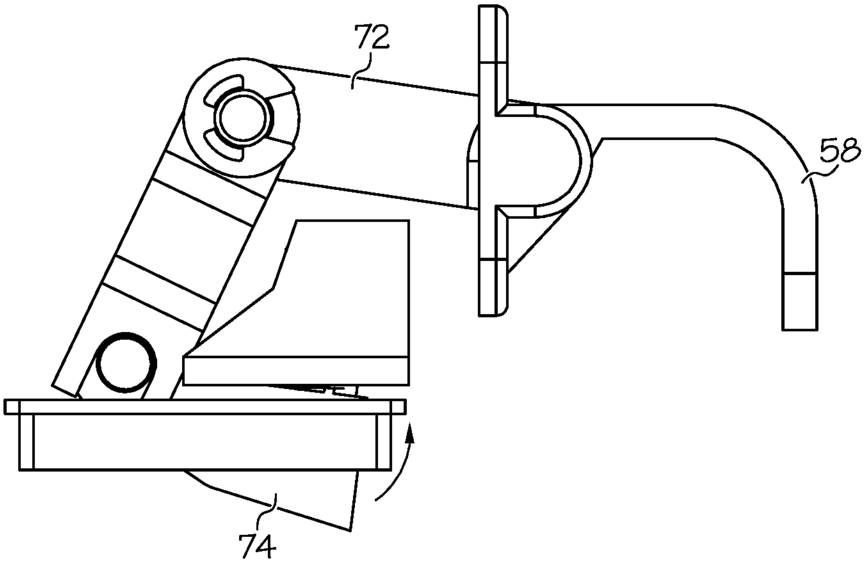
FIG. 9 is a side view of a latch assembly of the system of FIG. 1.
Figure 10:
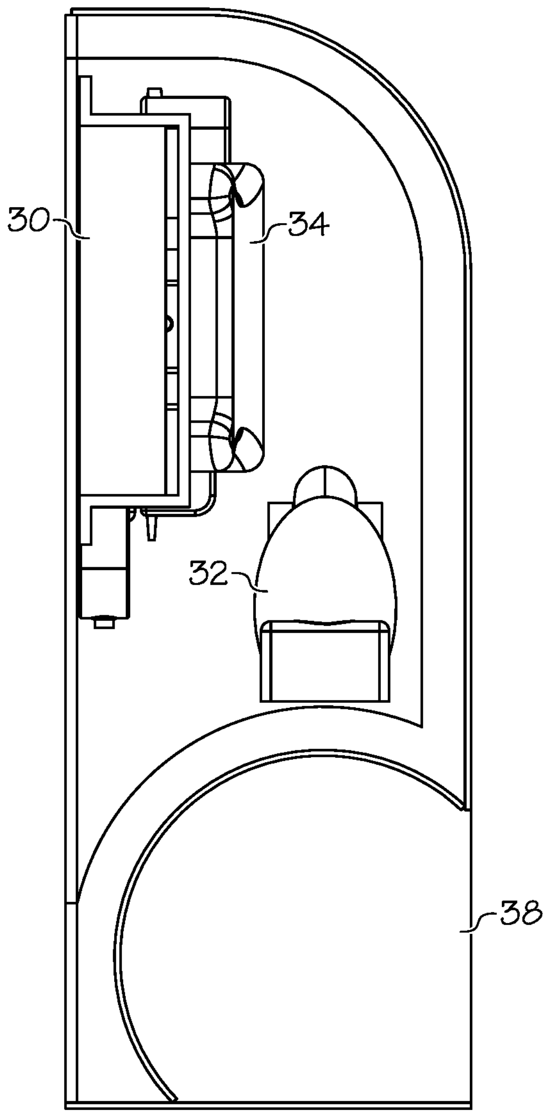
FIG. 10 is a side cutaway view of the interior of an electronics enclosure of the system of FIG. 1.
Figure 11:
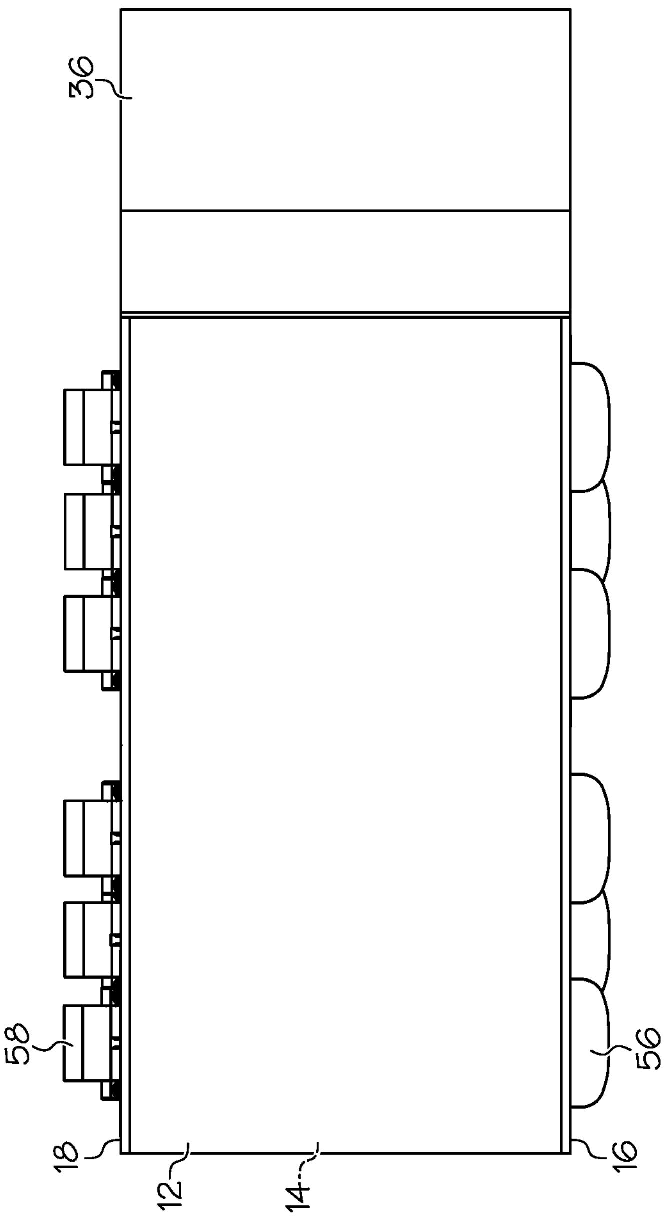
FIG. 11 is a top view of the system of FIG. 1.
Figure 12:
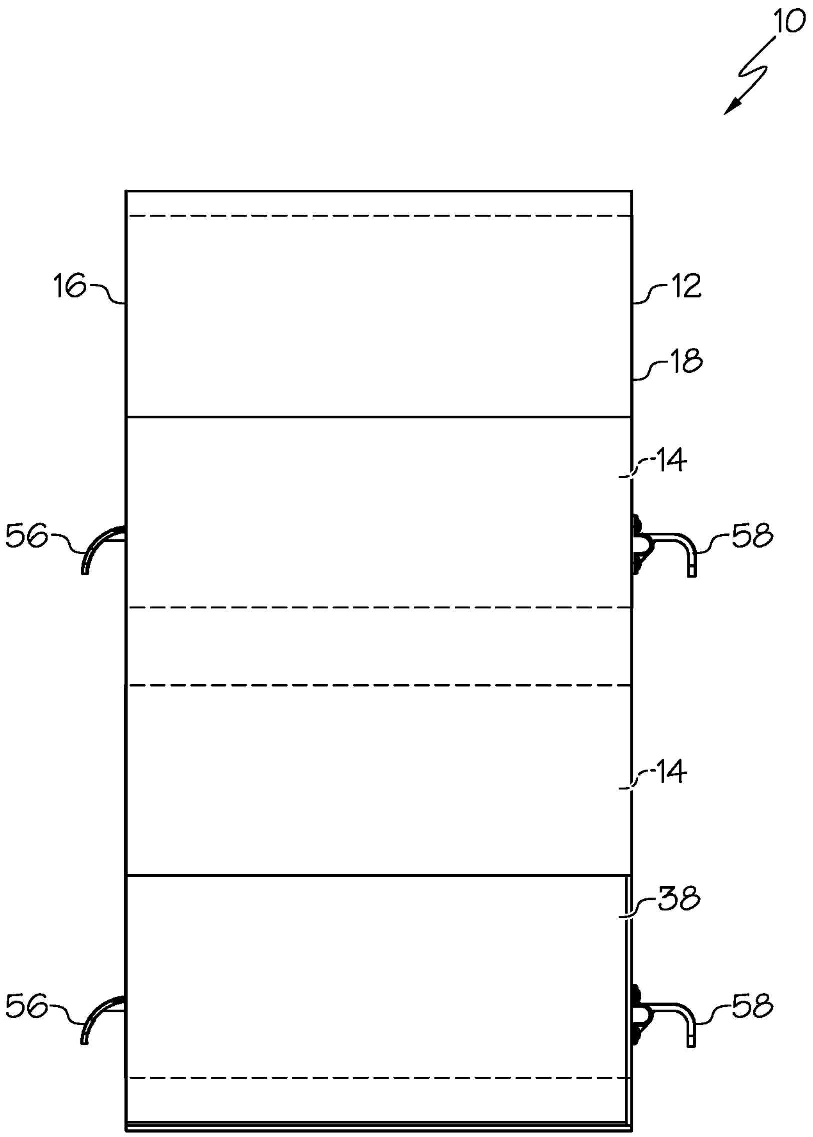
FIG. 12 is a side view of the system of FIG. 1.

With reference to FIGS. 3, 7, and 9, the order fulfillment system 10 may include, for each passageway 14/tray 24, a latch assembly 72 to control access to the contents of the tray 24 from the stocking side 18 of the frame 12 (and/or the retrieval side, if desired). The latch assembly 72 may include one or more levers (including, in one embodiment, the handle 58), hinges, and/or springs 73 operatively connected to a stop 74. The stop 74 may be spring-loaded and biased to extend through an opening 76 of a pivot plate 78 positioned within the channel 60 of the roller assembly 50 (FIG. 7), and receivable in a recess 80 (FIG. 3) of the frame 12. Accordingly, the stop 74 is movable to a blocking position where the stop 74 is positioned within the recesses 76 and/or 80 to prevent movement of the tray 24 through the opening 22 to the stocking side 18 of the frame 12 (e.g., with reference to FIG. 3, movement of the tray 24 to the right is blocked). In some cases, movement of the tray 24 in only a single direction (either single direction) is blocked when the latch assembly 72 is in its blocking position. Alternately, movement of the tray 24 in both directions is blocked when the latch assembly 72 is its blocking position.

The latch assembly 72/stop 74 also has an open position, where the latch assembly 72 can be manually operated, against the spring bias 73, to retract the stop 74 out of the recesses 76 and/or 80 (e.g. the stop 74 is pivotable in the direction of the arrow in FIG. 9). In this case the latch assembly 72 may thereby not block movement of the tray 24 out from the passageway 14 through the opening 22 on the stocking side 18 of the frame 12 and/or retrieval side 16. In the depicted embodiment of the latch assembly 72, the stop 74 is biased to the blocking position as its default position, and when the handle 58 is operated, the stop 74 is retracted upward out of the recess 80 to transition to the open position.

It should be appreciated that both the solenoid/activatable component 62 and the manually-operated latch assembly 72 (which together or apart, or in the form of various other mechanisms or devices, can constitute an access control system) could alternately include or take the form of any of a variety of lock and/or release mechanisms. For example, the latch assembly 72 could be replaced with a solenoid similar to that of solenoid 62, but with different control parameters, such as a pressure or force sensor or other sensor, a push button, a keypad, or the like that ensures that the latch assembly 72 is in or moves to the retracted positioned when the stocking party requires access to access the tray 24 for stocking. The latch assembly 72 and/or activatable component 62 may be operatively connected to and/or controlled by the controller 30. In this manner the latch assembly 72 and/or activatable component can also control access to the tray 24 on the stocking side 18 such that the stocking party may be required to provide identification or otherwise be authenticated prior to being able to move a tray 24 and/or gain access thereto.

One embodiment of an ordering process incorporating or utilizing the order fulfillment system 10 will now be described, in the exemplary context of a fulfilling an order for a beverage at a coffee shop, with reference to FIG. 13. The order fulfillment system 10 is, in this example, positioned within the coffee shop with the stocking side 18 of the frame 12 facing a restricted access area, for example facing behind the service counter 81, and the retrieval side 16 of the frame 12 facing a location accessible to the public, or a less-restricted area. In the default/starting configuration, all of the trays 24 are in their closed positions with all of the panels 26, 28 generally aligned with their associated openings 20, 22 of their respective passageways 14. Each solenoid 62 is in the extended position, where each associated plate 66 prevents extension of each associated tray 24 past the opening 20 on the retrieval side 16. In addition the stop 74 of each latch assembly 72 is in the blocking position, preventing extension of the tray 24 past the opening 22 on the stocking side 18.

A customer/retrieving party 82 can place an order with the coffee shop at a location remote from the shop, or (in one case) other than in a face-to-face transaction, for example through an internet website, a mobile application, a phone call, a fax order, or the like. FIG. 13 illustrates a remotely positioned mobile device 83 controlled by the customer 82 for placing such an order. Alternately, the order can be place via an in-person interaction with an on-site cashier, and the order can be fulfilled using the system 10 and method described herein, or the order can be placed using a mobile device 83 that is positioned on-site, etc. The order can be automatically or manually inputted into a computer system, point-of-sale device, etc. 84, which can be in communication with the system 10/controller 30. The order can be paid for by the customer 82 by their mobile device 83 (remotely) or paid for on-site or at the location of pick-up of the item 33.

A barista 86 (e.g. the stocking party) prepares the beverage 33, and once complete, prepares to load the beverage 33 into one of the plurality of compartments 14/trays 24 of the order fulfillment system 10 from the stocking side 18 of the frame 12. In one embodiment, the controller 30 selects the appropriate compartment 14/tray 24 for the stocking party 86 to use based upon size of the product 33, availability of the compartment 14/tray 24, expected pick-up time, accessibility/location of the compartment 14/tray 24, etc. The controller 30 then identifies the automatically selected compartment 14/tray 24 to the stocking party 86 via a video display/user interface 45, indicia 46 on the frame 12, or the like, and can open/unlock the associated door 35 on the stocking side 18 (if utilized). In an alternate embodiment, the stocking party 86 selects the compartment 14/tray 24 to be used and provides the compartment/tray identity information to the controller 30 via a user interface 45 such as a keyboard/keypad, touch screen, or other user input device, and/or the controller 30 may be able to automatically sense which compartment 14/tray 24 has been selected and/or used through various sensor.

To access the appropriate compartment 14/tray 24 and insert the beverage 33, the stocking party 86 opens the appropriate door 35 (if utilized) and depresses the handle 58 to activate the latch assembly 72. This movement of the handle 58 moves the stop 74 to the open/retracted position, and the stocking party 86 then pulls the tray 24 through the passageway 14 until the panel 28 and at least a portion of the product support portion 25 of the tray 24 extend past the opening 22. When the compartment 14/tray 24 is thus in its second extended position, the stocking party 86 is thereby provided direct manual access to the product support portion 25, and/or insert 40/cup holder 42 contained thereon. The stocking party 86 then positions the beverage 33 within the cup holder 42 (if utilized), and slides the tray 24 back towards the frame 12 until the tray 24 has returned to the closed position with the stop 74 of the latch assembly 72 back in the blocking position. In cases where a movable tray 24 is not utilized, the stocking party 86 can simply place the item 33 in the compartment 14 and on a relatively fixed tray 24', or directly on a lower surface of the compartment 14. Access to the compartment 14/tray 24 by the stocking party 86 can in some cases be open (unrestricted), or access can be controlled for each compartment 14, or a single access control system or cover or the like can be used which controls access to multiple compartments 14.

In one embodiment, the stocking party 86 then uses the user interface 45 to indicate to the controller 30 that the beverage 33 is positioned within the closed compartment 48, defined collectively in one case by the tray 24 and the compartment 14/frame 12 and/or doors 35, and ready for retrieval by the customer/retrieving party 82. In another embodiment, the order fulfillment system 10 includes sensors in communication with the controller 30 to automatically determine that the beverage or other item 33 is positioned in a compartment 14 and/or on a tray 24 and ready for retrieval. For example, the latch assembly 72 may include sensors that indicate to the controller 30 when the latch assembly 72 is opened and closed. The controller 30 may be programmed to recognize that for an assigned tray 24, opening the tray 24 from the stocking side 18 followed by closing the tray 24, indicates that an order is ready for pick up. Alternately, or in addition, the tray 24 may include weight sensors, cameras, presence sensors and/or other types of sensors in communication with the controller 30 to automatically determine when an order 33 is stocked, one embodiment of which is described in greater detail below.

Once the item 33 is stocked, the controller 30 may signal to the retrieving party 82 that the order is fulfilled and ready for pick-up, for example with an email, phone call, text message or other contact via mobile device 83, by an audio or visual signal, through interaction with a vibrating signal device, by providing an output from or one the frame 12 and/or compartment 14 and/or tray 24, via an output on the user interface 45 or a display screen, or any of a variety of other signaling methods. The compartment 14/tray 24/door 35 and/or the indicia 46 thereon may in one case illuminate, flash, make a sound, or otherwise provide additional signals to direct the customer to the proper compartment 14/tray 24 containing the customer's order. In some cases the signaling may only occur after payment for the item 33 has been received and/or when the customer 82 presents a code scanned by the scanner 32 or presents some other identifier so that the controller 30 knows that the customer is physically present.

The signal from the controller 30 and/or information provided to the customer at the time of purchase may also include additional information for the retrieving party 82, such as the identity (e.g. compartment number or door number) of the specific compartment 14/tray 24/door 35 which contains the order, a summary of the order contents, the amount of the payment due, a receipt indicating payments made, instructions or information for retrieval of the order (such as providing access codes or a scannable code), and the like. If the retrieving party 82 does not retrieve the order within a predefined period of time, for example, within 5, 10, 15, or 30 minutes, the controller 30 may send a follow-up communication to the retrieving party 82 and/or the stocking party 86 to indicate that the order has not been picked-up. This feature can be particularly useful for items that are desired to be served heated or cooled, or within a certain time window.

In any case, once the order it stocked and the customer notified, the customer 82 approaches the order fulfillment system 10 from the retrieval side 16 of the frame 12. Even though the customer's order is prepared, the compartments 14/trays 24/doors 35 may be locked from the retrieval side 16 so that the controller 30 can control the customer's access to the appropriate compartment 14/tray 24. The controller 30 can prevent movement of the tray 24 toward the retrieval side 16, and/or opening of the appropriate door 35 unless and until the controller 30 determines that an approved transaction has occurred and the customer is physically present, or the controller 30 otherwise receives information regarding approval of the transaction and/or dispensing. For example, the customer 82 may place the order remotely, but provide payment on-site, in which case the order may be stocked but not be made accessible unless and until payment is made.

The customer 82 may gain access to the compartment 14/tray 24 in any of a variety of ways. In one embodiment, the customer is provided with a scannable code on a purchase receipt, which may be printed or electronically displayed on a mobile device, such as mobile device 83 in FIG. 13 associated with the customer 82 inside the store. The customer 82 may then position the paper or device with the scannable code in proximity to the scanner 32, for example in one case in the aperture 38 of the frame 12. If the controller 30 accepts the code, access may be granted to the customer 82. Alternately, the retrieving party 82 may be provided with an access code or password, such as by including the code on the receipt and/or by text message, email, etc. The controller 30 may include and/or be operatively connected to a user interface 45 such as a keypad or a touchscreen, where the retrieving party 82 may enter the access code to authenticate access rights. Further alternately, access may be granted by any of a variety of other methods, including insertion of an authentication token, presentation of a key fob or other wireless device which transmits wirelessly in the radio frequency range (or other frequencies), a mechanical or electronic key, a card with a magnetic strip in conjunction with a magnetic strip/card reader, the use of biometrics, through insertion and acceptance of currency (similar to a vending machine), providing a code or password, or any other method known in the art.

When dispensing items such as alcoholic beverages, tobacco products, pharmaceuticals or other controlled substances or items, the retrieving party may be required to provide a secondary source of identification and/or identification which documents the age, identity or other authority of the retrieving party 82. In some cases the retrieving party 82 may provide an access code in an attempt to access the compartment 14 with the controlled item 33. The controller 30 may acknowledged the properly scanned code but then direct the retrieving party 82 to an on-site attendant before the controlled item 33 can be released. The on-site attendant can then review the credentials of the retrieving party 82, and when the credentials are verified the attendant can notify the controller 30 or provide a further access code to the retrieving party 82. The controller 30 can then provide access to the controlled item 33 (e.g. unlock a door 35 or activate the solenoid 62, as directed by the on-site attendant), or the system 10 may require the retrieving party to scan their access code a second time before providing access to the controlled item 33. Further alternatively, the system 10 may have systems that can scan and automatically authenticate a retrieving party 82 such as by, for example, scanning a drivers' license or other information with the person's age or credentials, and in some cases compare a visual scan of the person, to the identity presented in the person's credentials, such as through a scanner and/or remote camera.

Once the controller 30 verifies/authenticates the customer and/or grants access, the controller 30 can grant access by moving the plate 68 to the retracted position. This (or other action, as desired) thereby permits the customer 82 to use the handle 56 on the retrieval side 16 of the frame 12 to freely move the tray 24 until at least a portion of the product support portion 25 of the tray 24 is positioned past the opening 20 and/or access to the product 33 is provided. Alternately or in addition, when it is desired to provide access and a door 35 is utilized, the door 35 on the retrieval side 16 can be unlocked and/or opened. In one embodiment, the compartment 14/tray 24/door 35 may automatically fully or partially open upon authorization by the controller 30; e.g. by a motor, solenoid, by releasing a spring biased component, etc. Further alternately, the compartment 14/tray 24 and/or associated door 35 can be automatically unlocked once the customer 82 is authenticated and the customer's attention is directed to the fact that the compartment 14/tray 24 and/or door 35 is unlocked, or a simple interlock may be utilized that requires customer action to further open or access the compartment 14/tray 24. Once the door 35 and/or tray 24 is open, the customer may manually access and retrieve the beverage order or other item 33 from the compartment 14/tray 24 to complete the transaction.

In one embodiment, the controller 30 grants access only a single time per order, such that once the door 35/tray 24 has been opened and closed from the retrieval side 16 of the frame 12, the solenoid 62 resets to move the plate 66 back to the extended position and/or the door 35 is locked. The compartment 14/tray 24 can then be indicated to be ready for use for another order. If desired the controller 30 can grant access to multiple compartments 14/items 33 at a time. For example, a single order may be sufficiently large that it is placed in multiple compartments 14, and in this case authentication by the retrieving party 82 may grant access to all compartments 14 storing items 33 associated with the order. Optionally, the system 10 may include sensors to monitor whether the product 33 has actually been removed from the compartment 14/tray 24. In one embodiment, the order fulfillment system 10 may send an alert or message (e.g., an audio or visual signal, or digital signal via email, push notification, web site, sms, etc.) if the door 35 or tray 24 is not closed after order retrieval, to notify the stocking party 86. In another embodiment, the tray 24 and/or the frame 12 may include a mechanism to automatically retract the tray 24 after the order is retrieved and/or automatically close and/or lock the door 35.

In another embodiment of the system 10 as shown in FIGS. 14-20, the system 10 includes or takes the form of one or more modules 88, each of which has a frame 12 and a compartment positioned 14 therein. Each module 88 can include a door 35 on the retrieval side 16, but in the illustrated embodiment lacks (but could include) a door on the stocking side 18, and the compartment 14 is thus open in the stocking side 18 (see FIGS. 16-18). In one case, the system 10 and/or each module 88 can include an item sensor, presence sensor, or presence sensor system 90 configured to sense when items 33 are present in, placed in, not present in and/or removed from a compartment 14 or tray 24'. For example the item sensor 90 can include or take the form of pressure or force sensors, weight sensors, optical or line-of-sight sensors, detectors based on mechanical forces, membrane switches/sensors, magnetic switches/sensors, light or electromagnetic radiation (visible, infrared or otherwise) sensors, contact sensors, photoelectric sensors, ultrasonic sensors, piezoelectric sensors, piezoresistive sensors, accelerometers, motion sensors, tilt sensors, proximity sensors, electric field sensors beam break sensors, acoustical sensors, capacitive sensors or others. The item sensor 90 may be able to sense items 33 of various sizes, shapes, colors, transparencies, reflectances and weights located at various positions in the compartment 14 and/or positions on the tray 24'.

Figure 16:
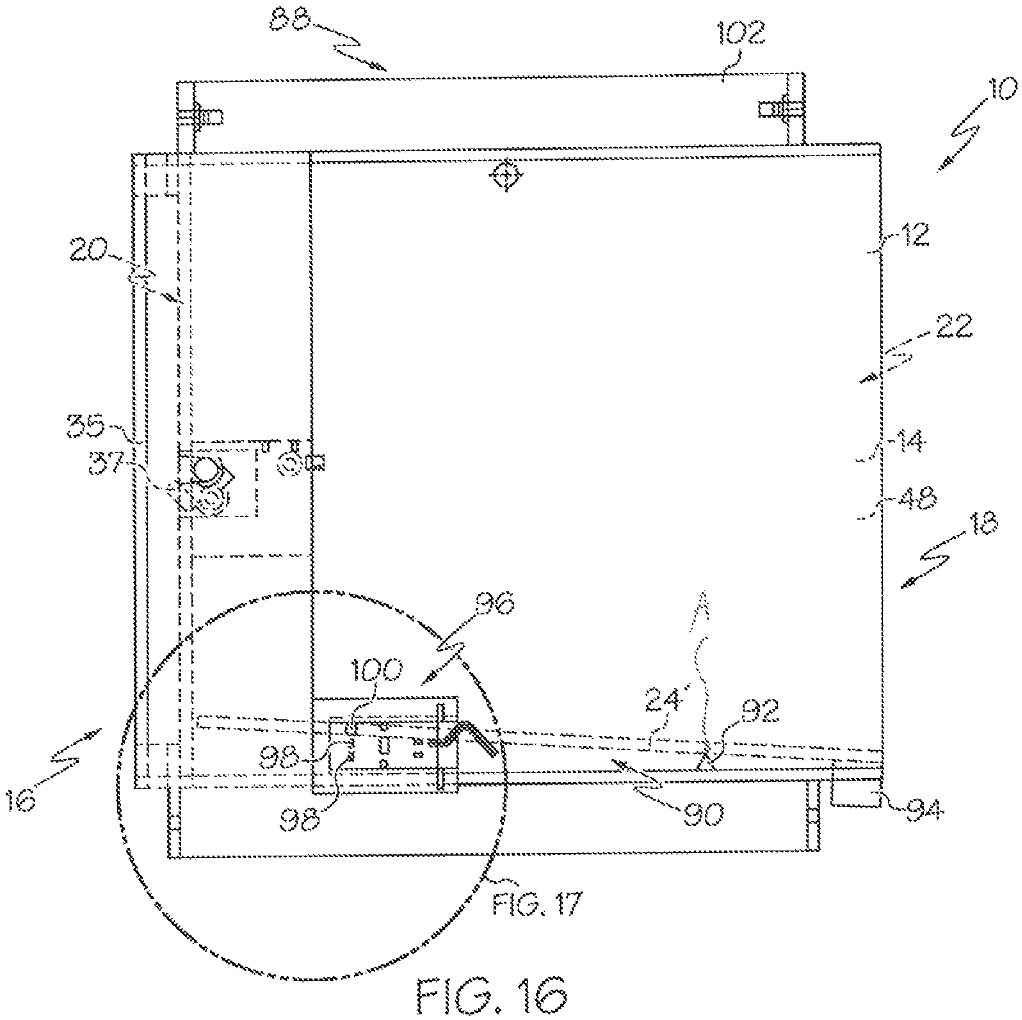
FIG. 16 is a side view of the module of FIG. 14, with the tray and sensor system shown in hidden lines.
Figure 17:
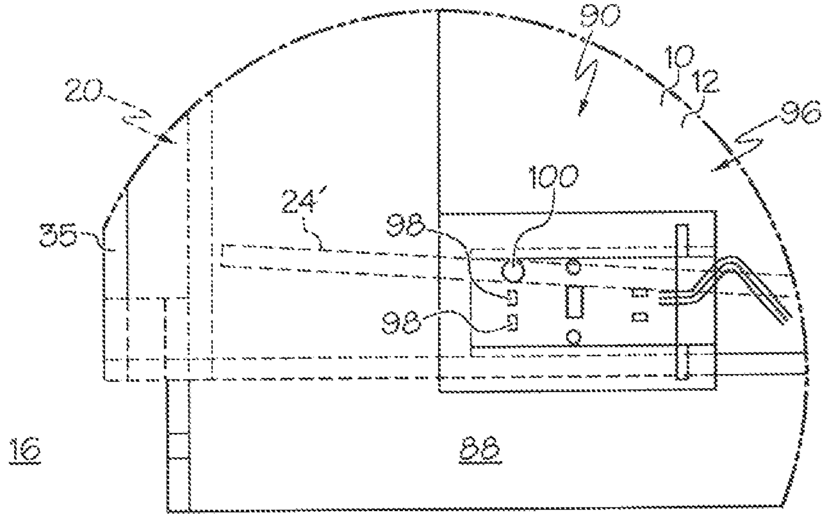
FIG. 17 is a detail view of the area indicated in FIG. 16.
Figure 18:
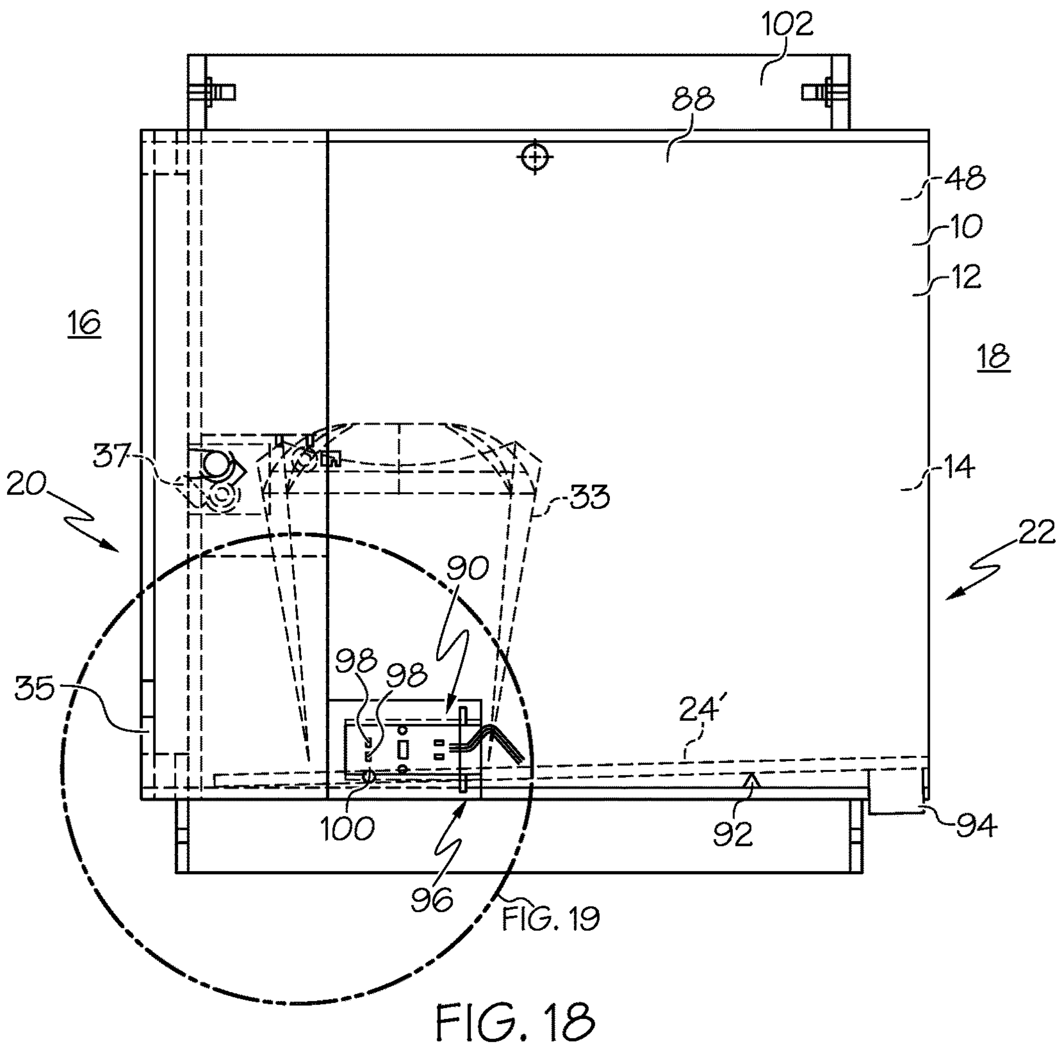
FIG. 18 is a side view of the module of FIG. 16, with an item positioned on the tray and the tray in its extended position.

In the embodiment of FIGS. 14-20, the compartment 14 does not include a slidable tray 24 therein, and instead a pivotable or tiltable tray 24' is positioned in the compartment 14 where the tray 24' is tiltable to sense when items 33 are present/absent and/or added/removed. Thus the item sensor 90 in this case can include the tray 24'. The tray 24' can be coupled to the underlying horizontal surface of the compartment 14 at or by a pivot mount or fulcrum 92 (FIGS. 16 and 18). The tray 24' can include a counterweight 94 coupled thereto, and be mounted/configured to be biased by gravity to a first/retracted position as shown in FIGS. 14, 16 and 17, where the tray 24' is positioned when no items 33 are placed thereon. The tray 24' can be slightly inclined relative to a horizontal direction (relative to a gravitational frame of reference) when in the retracted position. The angle of inclination can be relatively slight, such as less than about 5 degrees in one case. In addition tray 24' can be angled, when in the retracted position, away from the retrieval side 16 and toward the stocking side 18 so that any items (such as fluid spills, crumbs, etc.) may slide/roll down the tray 24' toward the stocking side 18.

Figure 19:
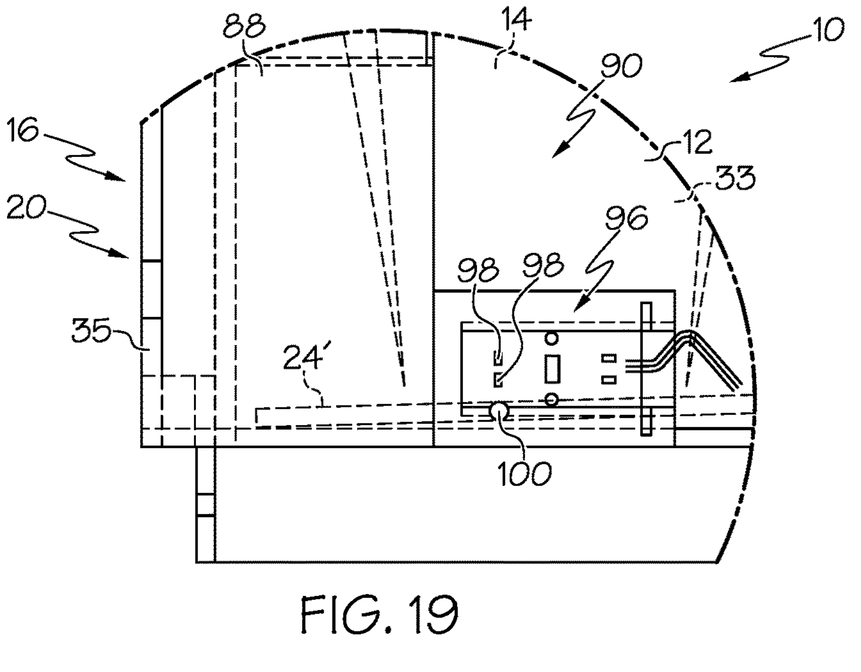
FIG. 19 is a detail view of the area indicated in FIG. 18.

The tray 24' can be configured to pivot about a generally horizontally extending axis via the pivot mount 92 to a second/extended position as shown in FIGS. 15, 18 and 19 when an item 33 or items 33 are placed thereon. When in the second position the tray can 24' be oriented generally horizontally, or with a slightly forward incline, but in one case is more level (e.g. has a smaller angle) than when the tray 24' is in its retracted position. The tray 24' and counterweight 94 can be configured so that the tray 24' is biased to the retracted position, but moves to the extended position when relatively little weight is positioned thereon (positioned on the side of the tray 24' positioned closer to the retrieval side 16). In one case the tray 24' moves from the retracted to the extended position when weight as little as about 1 gram (e.g. the weight of a small, empty cup) in placed on the tray 24' providing relatively high sensitivity. When the items 33 is removed from the tray 24', the tray 24' automatically returns to its retracted position due to the counterweight 94.

The system 10/item sensor 90 can include a tray position sensor 96 mounted on the frame 12 and configured to determine whether the tray 24' is in its first and/or second position, to thereby also determine if an item 33 for dispensing is positioned on the tray 24'. In one case the tray position sensor 96 is or includes a magnetic sensor with two magnetic sensor portions 98 that are vertically spaced away from each other, and a magnet 100 embedded in the tray 24' or coupled thereto. The magnetic sensor portions 98 are in one case positioned externally of the compartment 14 but can magnetically interact with the magnet 100 to sense the position of the tray 24'. The positions of the magnet 100 and magnetic sensor portions 98 can be reversed if desired such that the magnets 100 are positioned on the frame 12 and the magnet sensors 98 mounted on the tray 24'. Moreover, any of a wide variety of other sensors can be utilized to sense the position of the tray 24'.

When the tray 24' is in its retracted position, as shown in FIGS. 16 and 17, the output of the upper sensor 98 would be greater than the output of the lower sensor 98, due to the proximity of the magnet 100. The controller 30 can then use that information to determine that the tray 24' is in its retracted position. Conversely, when the tray 24' is in its extended position, as shown in FIGS. 18 and 19, the output of the lower sensor 98 would be greater than the output of the upper sensor 98, due to the proximity of the magnet 100. The controller 30 can then use that information to determine that the tray 24' is in its extended position, and that an item 33 is positioned on the tray 24'. The use of two sensor portions 98 can provide accurate sensing, and the sensor 96 can use logic/circuitry to store or retain the last position of the tray 24' in case the tray 24' travels past its expected range of movement, making adjustment of the item sensor 90 unnecessary. In this case the same sensor 90/96 or sensor logic/circuitry disclosed in the embodiment of FIGS. 14-20 can be used to sense the position of the movable tray 24 of the embodiment of FIGS. 1-13, in either its closed position, and/or extending into the retrieval side 16 and/or extending into the stocking side 18.

The item sensor 90/position sensor 96 can be operatively connected to the controller 30. In this manner, the controller 30 can determine when a compartment 14 has an item 33 positioned therein to notify a customer 82 and/or stocking party 86 that the item 33 is ready for pickup and/or send reminders to the customer 82 and/or stocking party 86 when an item 33 has not been picked-up after a predetermined period of time. The item sensor 90/position sensor 96 can also aid in tracking which compartments 14 are available for re-stocking after an item 33 has been picked up.

Figure 20:
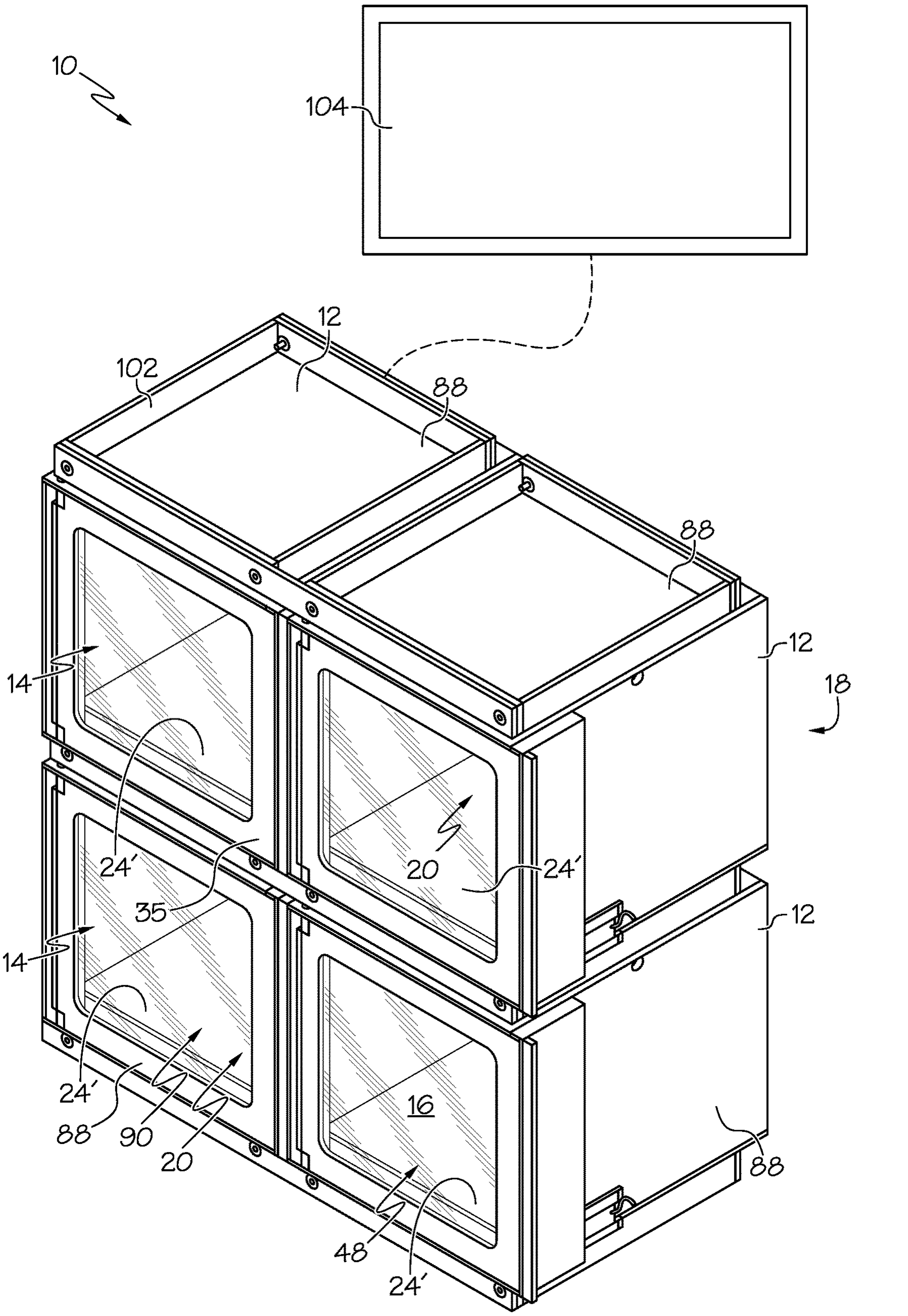
FIG. 20 is a front perspective view of a plurality of modules coupled together.

In one case the modules 88 are stackable and arrangeable in various configurations to provide a system 10 with modules/compartments in the desired arrangement and configuration, one of which is shown in FIG. 20. Each module 88 can include an upper protruding lip 102 extending around its perimeter that is configured to closely fit into an opening or recess on the bottom of another module 88 to aid in vertical stacking. If desired, one of the modules 88 in a stack or arrangement can be replaced with other modular components having generally the same size and shape, such as in one case a user-interface module including a user-interface screen 45 that is operatively connected to the controller 30.

Multiple systems 10 or modules 88 can be arranged as needed and coupled together and/or having their controllers 30 directly linked, or commonly linked to a controller 30 or computer system 84. Each system 10 or module 88 can share a common controller 30 that can be connected with the central computer system 84 by either wire or wireless connections. The systems 10/modules 88 can be stacked to form a complete countertop system or a free standing system, for example with a fascia covering the individual units to provide an integral appearance or branding theme to the systems 10/modules 88.

The system 10 can include or be coupled to one or more display devices 104 (FIG. 20), such as a monitor, television screen, display screen or the like, which can be included as part of the user interface 45 or as a separate display. The display device 104 can be viewable by customers 82 on the retrieval side 16 and can display various information such as status of the customer's order, wait time, advertising and promotional programming, etc. The display device 104, and/or a different display device, can also or instead be viewable by an employee/stocking party 86 and display information such as the content of orders to be filled, the status of orders in process, waiting time, which compartments 14 are to be filled/stocked with which items, etc. The display device 104 can also include and/or be connected to a user interface accessible by the stocking party 86 so that the stocking party 86 can indicate when an order is filled, or rearrange the priority of orders, provide bump bar functionality, etc.

Accordingly, the order fulfillment system 10 facilitates efficient self-service customer retrieval of goods, including remotely-purchased and/or remotely-ordered goods. A seller can remotely accept orders and/or payment for such orders from a plurality of customers, and then prepare each order for customer pickup in a secure manner without the need for interpersonal interaction with the customer and without the need to locate and provide each customer's particular order upon the customer's arrival. The system 10 thus enables both organization and segregation of each order into a different compartment 14/trays 24, 24', and also provides security to ensure that customers only retrieve the order(s) for which they have paid. The system and method saves time and improves efficiency for the customer, who can, in some embodiments, self-retrieve purchased products upon arrival at the sale or retrieval site without having to interact with store personnel. Efficiency is also improved for the seller who may not need to dedicate personnel to locate and provide orders to the customer upon the customer's arrival. Efficiency is also improved for other on-site customers who might otherwise experience increased wait time due to personal interactions to provide completed orders to remote-order customers.

Although the invention is shown and described with respect to certain embodiments, it should be clear that modifications will occur to those skilled in the art upon reading and understanding the specification, and the present invention includes all such modifications.

What is claimed is:

1. An order fulfillment system comprising:

a frame defining a passageway, wherein said passageway is a continuous opening extending through said frame in a horizontal direction;

a tray positioned in the passageway and pivotable about a generally horizontally oriented axis between a first position and a second position;

a sensor system configured to sense the position of the tray in at least one of the first or second positions, wherein the sensor system includes an electronic sensor configured to provide an output; and a controller operatively coupled to said sensor system.

2. The system of claim 1 wherein the tray is pivotable between the first position when no items are positioned on the tray and the second position when an item or items of a sufficient predetermined weight are positioned on the tray.

3. The system of claim 1 wherein the tray is configured such that when the tray is in the first position the tray is inclined relative to a horizontal frame of reference at a first angle and when in the second position the tray is inclined relative to the horizontal frame of reference at a second angle that is different from said first angle.

4. The system of claim 1 wherein the tray is configured such that when the tray is in the first position the tray is angled away from a front of the frame and when in the second position the tray is not angled away from the front of the frame.

5. The system of claim 1 wherein said passageway has a first opening at a first end thereof on a first side of said frame and a second opening at a second, opposite end thereof on a second side of said frame.

6. The system of claim 5 wherein the system is configured such that an item to be dispensed is insertable into the passageway and onto the tray in a horizontal direction through said first opening, and wherein the item is thereafter removable from the passageway in the horizontal direction through said second opening.

7. The system of claim 1 wherein the frame defines a plurality of passageways and each passageway includes a pivotable tray positioned therein, and wherein the sensor system is configured to sense the position of each tray.

8. The system of claim 1 further comprising a door coupled to said frame, wherein said door is movable between a first position where said door generally blocks access to at least one end of said passageway and a second position where said door does not generally block access to said end of said passageway.

9. The system of claim 1 wherein the controller is configured to determine whether an item or items of a sufficient predetermined weight are positioned on the tray.

10. The system of claim 1 further comprising a door coupled to said frame and aligned with the passageway in the horizontal direction, wherein said door is movable about a vertical axis between a first position where said door generally blocks access to at least one end of said passageway and a second position where said door does not generally block access to said at least one end of said passageway, and wherein said controller is operatively coupled to said door to lock or unlock said door in said first position.

11. The system of claim 10 wherein the controller is configured to retain said door in a locked state unless the controller determines that an approved transaction has occurred or unless the controller receives information that an approved transaction has occurred, after which the controller is configured to unlock said door.

12. The system of claim 1 wherein the controller is configured to receive an input relating to a proof of purchase of an item and to thereafter provide access to a user to said passageway.

13. The system of claim 1 wherein said sensor system includes a magnet mounted on one of the tray or the frame, and a magnet sensor located on the other one of the tray or the frame.

14. The system of claim 1 wherein the system is configured such that the tray is angled away from a retrieval side of the frame when in the first position, and is oriented horizontally or with a forward incline relative to the retrieval side when in the second position.

15. The system of claim 5 wherein the system is configured to provide manual access to the tray through both the first opening and the second opening.

16. The system of claim 15 wherein the tray has a length and a width generally corresponding to a length and a width of a floor of the passageway.

17. The system of claim 5 wherein the first opening and the second opening are generally horizontally aligned.

18. The system of claim 1 wherein the sensor system includes a pair of sensor portions, wherein the first sensor portion is configured to detect when the tray is in the first position, and wherein the second sensor portion is configured to detect when the tray is in the second position.

19. The system of claim 18 wherein the first and second sensor portions are vertically spaced apart.

20. The system of claim 1 wherein the sensor system includes a pair of sensor portions, wherein the tray is configured to be positioned adjacent to the first sensor portion and not the second sensor portion when the tray is in the first position, and wherein the tray is configured to be positioned adjacent to the second sensor portion and not the first sensor portion when the tray is in the second position.

21. The system of claim 1 wherein the controller is at least one of a processor, CPU or computer.

22. The system of claim 1 wherein the sensor system is configured to sense the position of the tray in the first position and the second position.

23. The system of claim 1 wherein the passageway extends entirely through the frame.

24. The system of claim 1 wherein the tray is pivotable about a horizontally oriented axis.

25. An order fulfillment system comprising:

a frame having a stocking side and a retrieval side, the frame including a passageway extending entirely through the frame from the stocking side to the retrieval side and configured to receive an item therein;

an access control system configured to control access to the passageway;

a controller operatively connected to the access control system;

a tray positioned in the passageway and pivotable between a first position when no items are positioned on the tray and a second position when an item or items of sufficient predetermined weight are positioned on the tray; and a tray position sensor system configured to sense the position of the tray in at least one of the first or second positions, wherein the tray position sensor system includes an electronic sensor configured to provide an output to the controller.

26. The system of claim 25 wherein the controller is configured to cause the access control system to generally block access to the passageway from the retrieval side unless the controller determines that an approved transaction has occurred or unless the controller receives information that an approved transaction has occurred, after which the controller is configured to cause the access control system to generally allow access to the passageway from the retrieval side.

27. The system of claim 25 wherein the tray position sensor system is configured to sense at least one of the presence, absence, placement or removal of an item in the passageway.

28. The system of claim 25 wherein the tray position sensor system includes a pair of sensor portions, wherein the first sensor portion is configured to detect when the tray is in the first position, and wherein the second sensor portion is configured to detect when the tray is in the second position.

29. The system of claim 25 wherein the sensor system is configured to sense the position of the tray in the first position and the second position.

30. The system of claim 25 wherein the sufficient predetermined weight of the item or items causes the tray to pivot from the first position to the second position.

31. The system of claim 25 wherein the tray is pivotable about a generally horizontally oriented axis.

32. An order fulfillment system comprising:

a frame defining a passageway;

a tray positioned in the passageway and pivotable about a generally horizontally oriented axis between a first position and a second position;

a first sensor portion positioned adjacent to the tray and configured to sense when the tray is in the first position;

a second sensor portion positioned adjacent to the tray and configured to sense when the tray is in the second position; and a controller operatively coupled to said first sensor portion and to said second sensor portion.

33. An order fulfillment system comprising:

a frame defining a passageway;

a tray positioned in the passageway and pivotable about a generally horizontally oriented axis between a first position when no items are positioned on the tray such that the tray is inclined relative to a horizontal plane at a first angle and a second position when an item or items of sufficient predetermined weight are positioned on the tray such that the tray is inclined relative to a horizontal plane at a second angle that is different from said first angle;

a door coupled to said frame, wherein said door is movable between a first position where said door generally blocks access to at least one end of said passageway and a second position where said door does not generally block access to said at least one end of said passageway; and a controller operatively coupled to said door and configured to retain said door in said first position unless the controller determines that an approved transaction has occurred or unless the controller receives information that an approved transaction has occurred.

34. The system of claim 33 wherein the frame has a stocking side and a retrieval side, and wherein the passageway extends from the stocking side to the retrieval side and is configured to receive an item therein.

35. The system of claim 33 wherein the door is pivotally coupled to the frame.

36. The system of claim 33 further comprising a tray position sensor system configured to sense the position of the tray in at least one of the first or second positions and, wherein the tray position sensor system includes an electronic sensor configured to provide an output.

37. The system of claim 36 wherein the sensor system is operatively coupled to the controller.

38. The system of claim 36 wherein the sensor system is configured to sense the position of the tray in the first position and the second position.

39. The system of claim 33 wherein the system is configured to provide manual access to the tray through the at least one end of the passageway when the door is in the second position.

* * * * *